US009304961B2

(12) United States Patent  
Schroder et al.

(10) Patent No.: US 9,304,961 B2  
(45) Date of Patent: Apr. 5, 2016

(54) METHOD AND APPARATUS FOR TRANSFERRING PACKETS BETWEEN INTERFACE CONTROL MODULES OF LINE CARDS

(71) Applicant: Marvell World Trade Ltd., St. Michael (BB)

(72) Inventors: Jacob J Schroder, Lyngby (DK); Claus F. Hoyer, Espergaerde (DK); Peter Korger, Lynge (DK); Lars Froslev-Nielsen, Lynge (DK)

(73) Assignee: Marvell World Trade Ltd., St. Michael (BB)

( * ) Notice: Subject to any disclaimer, the term of this patent is extended or adjusted under 35 U.S.C. 154(b) by 324 days.

(21) Appl. No.: 14/020,121

(22) Filed: Sep. 6, 2013

(65) Prior Publication Data

US 2014/0075085 A1   Mar. 13, 2014

Related U.S. Application Data

(60) Provisional application No. 61/699,154, filed on Sep. 10, 2012.

(51) Int. Cl.
| | |
|---|---|
| *H04L 12/28* | (2006.01) |
| *G06F 13/40* | (2006.01) |
| *H04L 12/933* | (2013.01) |
| *H04L 12/937* | (2013.01) |

(52) U.S. Cl.
CPC .......... *G06F 13/4022* (2013.01); *H04L 49/101* (2013.01); *H04L 49/254* (2013.01)

(58) Field of Classification Search
CPC .......................... G06F 13/4022; H04L 49/101
See application file for complete search history.

(56) References Cited

U.S. PATENT DOCUMENTS

| | | | | |
|---|---|---|---|---|
| 6,665,495 | B1 * | 12/2003 | Miles | H04L 45/00 370/351 |
| 6,920,135 | B1 * | 7/2005 | Lea | H04L 49/1507 370/389 |
| 6,985,486 | B1 | 1/2006 | Agrawal | |
| 7,623,456 | B1 * | 11/2009 | Chen | H04L 12/5693 370/235 |
| 8,121,122 | B2 * | 2/2012 | Minkenberg | H04L 12/66 370/390 |
| 8,345,536 | B1 * | 1/2013 | Rao | H04L 45/58 370/216 |
| 2004/0085897 | A1 * | 5/2004 | Jacobi | H04L 49/205 370/229 |
| 2005/0207436 | A1 * | 9/2005 | Varma | H04L 1/0083 370/412 |
| 2006/0165098 | A1 | 7/2006 | Varma | |
| 2006/0171381 | A1 * | 8/2006 | Benner | H04Q 3/5455 370/386 |

\* cited by examiner

*Primary Examiner* — Tammara Peyton

(57) ABSTRACT

An access system includes line cards. The line cards include first and second line cards. The first line card receives a first packet and includes a first interface control module that generates a first request signal to transfer the first packet. The first request signal includes an identifier of a second interface control module in the second line card. Crossbar modules are separate from the line cards and include first and second crossbar modules. The first crossbar module includes a first scheduler module. The second crossbar module transfers packets between a pair of the line cards. The packets include the first packet. The first scheduler module is separate from the line cards and, based on the first request signal, schedules the transfer of the packets from the first interface control module, through the second crossbar module, and to the second interface control module.

20 Claims, 13 Drawing Sheets

METHOD AND APPARATUS FOR TRANSFERRING PACKETS BETWEEN INTERFACE CONTROL MODULES OF LINE CARDS

CROSS-REFERENCE TO RELATED APPLICATIONS

This application claims the benefit of U.S. Provisional Application No. 61/699,154 filed on Sep. 10, 2012. The entire disclosure of the application referenced above is incorporated herein by reference.

FIELD

The present disclosure relates to network access systems, and more particularly to the transfer of packets between cards and/or chassis of a network access system.

BACKGROUND

Access networks provide connections between two or more network devices and/or between a network device and an Internet. The network devices may include, for example, user devices, peripheral devices, and data storage devices. The network devices may be located in one or more networks. The connections are established to uplink signals and/or downlink signals between the network devices and/or between the network devices and the Internet.

As an example, an Ethernet-based access network may include a chassis. The chassis provides connections between network devices and/or between the network devices and the Internet. The chassis may include, for example, switch cards and line cards. Each of the switch cards can be connected to each of the line cards. The line cards are connected to the network devices via an Ethernet network. Predetermined ports or uplink ports of one or more of the line cards may be connected to the Internet. The switch cards provide connections between the line cards. The line cards provide connections between the network devices and the switch cards and/or between the switch cards and the Internet.

SUMMARY

An access system is provided and includes line cards and crossbar modules. The line cards include a first line card and a second line card. The first line card includes a physical layer module configured to receive a first packet, and a first interface control module configured to generate a first request signal to transfer the first packet. The first request signal includes an identifier of a second interface control module in the second line card. The crossbar modules are separate from the line cards and include a first crossbar module and a second crossbar module. The first crossbar module includes a first scheduler module. The second crossbar module is configured to transfer packets between a pair of the line cards. The packets include the first packet. The first scheduler module is separate from the line cards and is configured to, based on the first request signal, schedule the transfer of the first packet or the packets from the first interface control module, through the second crossbar module, and to the second interface control module.

In other features, each of the crossbar modules is allocated to a respective one or more pairs of the line cards. Each of the crossbar modules is not allocated to a same pair of the line cards as the other ones of the crossbar modules.

In other features, the second crossbar module is configured to schedule transfers of packets through each of the crossbar modules.

In other features, the first line card or the first interface control module is configured to transmit the first request signal to the first crossbar module. The first crossbar module is configured to transmit the first request signal to the first scheduler module.

In other features, a first one or more of the crossbar modules are allocated for scheduling of packets. The first one or more of the crossbar modules includes the first crossbar module; a second one or more of the crossbar modules are allocated for transferring packets between pairs of the line cards. The second one or more of the crossbar modules includes the second crossbar module. The first one or more of the crossbar modules schedule transfers of packets through the second one or more of the crossbar modules.

In other features, at least one of the first line card or the first interface control module is configured to (i) generate the first request signal to transfer the first packet from the first line card to at least one of the second line card or the second interface control module, and (ii) transmit the first request signal to the scheduler module. The scheduler module is configured to transmit a first acknowledgement signal indicating a first one or more of the crossbar modules through which the first packet is to be passed. At least one of the first line card or the first interface control module is configured to, in response to the first acknowledgement signal, transmit the first packet to at least one of the second line card and the second interface control module via the a first one or more of the crossbar modules.

In other features, at least one of the first line card or the first interface control module is configured to append a header on the first packet in response to the first acknowledgement signal. The header indicates to the first one or more of the crossbar modules at least one of an identifier of the second line card or an identifier of the second interface control module. The first one or more of the crossbar modules transfers the first packet according to the header.

In other features, the header includes (i) an identifier of a crossbar module in the first one or more of the crossbar modules, or (ii) identifiers of links of a crossbar module in the first one or more of the crossbar modules.

In other features, the first interface control module is configured to, subsequent to the transmitting of the first request signal: generate a second request signal to transfer a first one or more sets of packets from the first interface control module to one or more interface control modules, where the one or more interface control modules are on respective ones of the line cards; and transmit the second request signal to the scheduler module. The scheduler module is configured to transmit a second acknowledgement signal indicating a second one or more of the crossbar modules through which the first one or more sets of packets is to be passed.

In other features, the first one or more of the crossbar modules is configured to transfer the first packet from the first line card to the second line card.

In other features, the second one or more of the crossbar modules is configured to transfer the first one or more sets of packets from the first line card to the second line card.

In other features, the first one or more of the crossbar modules includes: a first crossbar module of a first chassis; a second crossbar module of a second chassis, where the second crossbar module is configured to transfer the first packet and the first one or more sets of packets from the first line card to the first crossbar module; and a third cross bar of a third chassis. The third crossbar is configured to transfer the first packet and the first one or more sets of packets from the first crossbar module to the second line card.

In other features, the first line card is configured to send the first request signal to the scheduler module via a third crossbar module. The first one or more of the crossbar modules and the second one or more of the crossbar modules do not include the third crossbar module.

In other features, the scheduler module is configured to generate the first acknowledgement signal to include identifiers for the first one or more of the crossbar modules. The second acknowledgement signal to include identifiers for the second one or more of the crossbar modules.

In other features, at least one of the first line card or the first interface control module is configured to, in response to the second acknowledgment signal, transfer a second one or more sets of packets to one or more of the crossbar modules instead of the first one or more sets of packets. The second one or more sets of packets having a higher priority level than the first one or more sets of packets.

In other features, the first line card is configured to transfer full packets at a time to an assigned one of the crossbar modules; and the first packet is a full packet.

In other features, at least one of the first line card or the first interface control module is configured to (i) generate the first request signal to transfer the first packet from the first line card to at least one of the second line card or the second interface control module, and (ii) transmit the first request signal to the scheduler module. At least one of the first line card or the first interface control module is configured to, subsequent to the transmitting of the first request signal: generate a second request signal to transfer one or more sets of packets from the first interface control module to the second interface control module or a third interface control module, wherein the third interface control module is on a third line card; and (ii) transmit the second request signal to the scheduler module. The one or more sets of packets do not include the first packet. The first line card is configured to send a release signal to the scheduler module, wherein the release signal indicates a collective size of the first packet and the one or more sets of packets. The scheduler module is configured to (i) drop the first request signal, and (ii) transmit an acknowledgement signal indicating one or more of the crossbar modules through which the one or more sets of packets is to be passed. The first line card is configured to, based on the acknowledgement signal, transmit the first packet and the one or more sets of packets.

In other features, the scheduler module is configured to (i) select a crossbar module for the first packet, and (ii) generate an acknowledgement signal. The acknowledgement signal includes (i) a link identifier for the selected crossbar module, and (ii) a link identifier for the second interface control module. The first interface control module is configured to, based on the link identifier of the selected crossbar module, forward the first packet to the selected crossbar module; and the selected crossbar module is configured to, based on the link identifier of the second interface control module, forward the first packet to the second interface control module.

In other features, the crossbar modules include queues. The scheduler module is configured to (i) store status values for the queues, and (ii) based on the status values, assign link identifiers for the packets. The link identifiers include identifiers of one or more of the crossbar modules and one or more of the line cards.

In other features, the line cards are configured to generate request signals to transfer data via the crossbar modules. The scheduler module is configured to prevent links of the crossbar modules from being used for a request signal to transfer a first amount of data until a request signal to transfer a second amount of data have been satisfied. The first amount of data is less than an amount of data in a full set of packets. The second amount of data is greater than or equal to the amount of data in a full set of packets.

In other features, the access system further includes a second scheduler module. The first scheduler module and the second scheduler module are assigned to (i) respective crossbar modules, and (ii) respective interface control modules of the line cards.

In other features, the crossbar modules assigned to the first scheduler module includes: a first crossbar module connected to the first line card; a second crossbar module connected to the second line card; and a third crossbar module connected between the first crossbar module assigned to the first scheduler module and the second crossbar module assigned to the first scheduler module. The crossbar modules assigned to the second scheduler module include: a fourth crossbar module connected to a third line card; a fifth crossbar module connected to a fourth line card; and a sixth crossbar module connected between the fourth crossbar module and the fifth crossbar module.

In other features, one of the crossbar modules is configured to (i) determine a fill level of a queue in the one of the crossbar modules, (ii) in response to the fill level of the queue being different than a predetermined level, send a first status message to at least one of the second line card or the second interface control module. The predetermined level is at least one of (i) equal to a status value stored in the scheduler module, or (ii) set based on a size of one or more sets of packets corresponding to the first request signal. At least one of the second line card or the second interface control module is configured to one of (i) forward the first status message to the scheduler module, or (ii) generate a second status message based on the first status message and transmit the second status message to the scheduler module. The scheduler module is configured to adjust the status value based on the first status message or the second status message.

In other features, the scheduler module is configured to: receive one or more first request signals from one or more of the line cards, where each of the first request signals is for a non-full set of packets, and where a full set of packets has a predetermined number of packets; subsequent to receiving the one or more first request signals, receive one or more second request signals from one or more of the line cards, where each of the one or more second request signals is for one or more full sets of packets; and prior to scheduling transfer of the non-full sets of packets, schedule transfer of the one or more full sets of packets from the one or more of the line cards to the crossbar modules.

In other features, the scheduler module includes: a first pruning module configured to (i) determine whether there is an available crossbar module for the first request signal, and (ii) if there is an available crossbar, forward the first request signal; a second pruning module configured to (i) determine whether there is an available crossbar module for a second request signal, and (ii) if there is an available crossbar module, forward the second request signal; and at least one arbitration module configured to arbitrate the first request signal and the second request signal including selecting an order in which the first request signal and the second request signal are to be forwarded from the at least one arbitration module.

In other features, the scheduler module includes a filter configured to commit an acknowledgement signal for the first request signal and drop the second request signal.

In other features, the scheduler module includes pruning modules, first and second arbitration modules, and an acknowledgement module. The pruning modules are configured to (i) monitor states of queues, where the queues store a request signals for one or more of the line cards, (ii) determine whether there is one or more available crossbar modules for the request signals, and (iii) forward the request signals when there is one or more available crossbar modules. The first arbitration module is configured to arbitrate the request signals including selecting an order in which the request signals are forwarded from the first arbitration module. The second arbitration module is configured to arbitrate the request signals including selecting an order in which the request signals are forwarded from the second arbitration module. The acknowledgement module is configured to (i) receive the request signals from the second arbitration module, (ii) generate acknowledgement signals based on the request signals, and (iii) forward the acknowledgement signals to respective interface control modules of the line cards.

In other features, the pruning modules are configured to forward the request signals to the first arbitration module in a first order. The first arbitration module is configured to forward the request signals to the second arbitration module in a second order. The second arbitration module is configured to forward the request signals to the acknowledgement module in the first order.

In other features, the pruning modules are configured to forward the request signals to the first arbitration module in a first order. The first arbitration module is configured to forward the request signals to the second arbitration module in a first random order. The second arbitration module is configured to forward the request signals to the acknowledgement module in a second random order.

In other features, the first interface control module is configured to (i) aggregate second packets, (ii) generate a second request signal for the second packets, and (iii) forward the second request signal to the scheduler module. The scheduler module is configured to generate an acknowledgement signal in response to the second request signal. The first line card is configured to forward the second packets to the second line card in response to the acknowledgement signal.

In other features, the first line card is configured to transmit a release signal to the scheduler module when the second packets are forwarded to one or more of the crossbar modules. The release signal indicates a collective size of the second packets. The scheduler module is configured to track a state of the one or more of the crossbar modules based on the release signal.

In other features, the scheduler module is configured to: receive a request signals for packets from the first line card; generate a single acknowledgment signal for the request signals; and transmit the acknowledgment signal for the request signals to the first line card.

In other features, a first one of the line cards, the scheduler module, and one of the crossbar modules includes a medium access control module, a first message module and a physical layer module. The medium access control module is configured to generate one of a control signal and a data signal based on the first packet. The data signal includes the first packet. The first message module configured to insert a control message into one of the control signal and the data signal. The physical layer module is configured to transmit the one of the control signal and the data signal to a second one of the line cards, the scheduler module, and one of the crossbar modules. The second one of the line cards, the scheduler module, and one of the crossbar modules includes a second physical layer module configured to receive the one of the control signal and the data signal, and a second message module. The second message module is configured to (i) remove the control message from the one of the control signal and the data signal, and (ii) forward the one of the control signal and the data signal without the control message to a second medium access control module.

In other features, the line cards include a third line card. The third line card is configured to: receive a second packet, where the second packet is larger than the first packet; determine a size of the second packet to be greater than a predetermined size; split up the second packet into at least a first portion and a second portion; generate a second request signal for the first portion of the second packet; and generate a third request signal for the second portion of the second packet. The scheduler module is configured to generate (i) a first acknowledgment signal based on the first packet, (ii) generate a second acknowledgement signal based on the first portion of the second packet, and (iii) generate a third acknowledgement signal based on the second portion of the second packet. The first line card is configured to forward the first packet based on the first acknowledgment signal. The second line card is configured to (i) forward the first portion of the second packet based on the second acknowledgement signal, and (ii) forward the second portion of the second packet based on the third acknowledgement signal.

In other features, the second line card is configured to: receive the second portion of the second packet prior to receiving the first portion of the second packet; and reorder and reassemble (i) the first portion of the second packet, and (ii) the second portion of the second packet.

In other features, one of the crossbar modules is configured to interleave unicast packets in a multicast packet.

In other features, the one of the crossbar modules is configured to receive a first portion of the multicast packet prior to reception of the unicast packets.

In other features, the scheduler module is configured to delay transmission of a unicast packet on a link based on transmission of a multicast packet on the link. The link is (i) between the first line card and one of the crossbar modules, or (ii) between the one of the crossbar modules and the second line card.

In other features, one of the crossbar modules is configured to (i) store received multicast packets, and (ii) transmit one of the multicast packets on a link at a time.

In other features, the scheduler module is configured to (i) schedule and track transmission of unicast packets between the line cards and the crossbar modules, and (ii) track transmission of multicast packets between the line cards and the crossbar modules. The scheduler module does not schedule transmission of the multicast packets.

In other features, the first line card is configured to generate the first request signal to schedule transmission of the packets. The first scheduler module is configured to, based on the first request signal, (i) schedule the packets, and (ii) generate an acknowledgement signal. The first line card is configured to, based on the acknowledgement signal, (i) transmit the packets, and (ii) generate a release signal indicating a collective size of the packets. The first line card is configured to (i) adjust status values of traffic on links in the access system based on the release signal, and (ii) schedule a transmission of a packet, not included in the packets, based on the state values.

In other features, a scheduler module is provided and includes a request module that includes queues. The request module is configured to (i) receive request signals from a first one or more line cards, and (ii) store the request signals in the queues. A core module is configured to schedule transfer of packets corresponding to the request signals from the first one or more line cards through one or more crossbar modules to a second one or more line cards. A link state module is configured to monitor (i) first states of first links between the first one or more line cards and the one or more crossbar modules, and (ii) second states of second links between the one or more crossbar modules and the second one or more line cards. The scheduler module is configured to (i) based on the states of the first links and the states of the second links, schedule the transfer of the packets on assigned ones of the first links and the second links, and (ii) based on the request signals, generate one or more acknowledgement signals identifying the assigned one or more first links and second links.

In other features, the scheduler module includes: a queue state module configured to (i) monitor states of the queues, and (ii) generate a first state signal indicating a request signal is present in one of the queues; a pruning module configured to (i) receive a link availability signal from the link state module, (ii) receive the first state signal from the queue state module, and (iii) forward one or more of the request signals based on the link availability signal; at least one arbitration module configured to (i) receive the one or more of the request signals, (ii) match the one or more of the request signals to available links to generate matches; and an acknowledgement module configured to (i) receive the matches, and (ii) generate the one or more acknowledgement signals based on the matches.

In other features, the at least one arbitration module includes a first arbitration module configured to arbitrate the request signals and generate first matches, and a second arbitration module connected in parallel with the first arbitration module. The second arbitration module is configured to arbitrate the request signals and generate second matches. The acknowledgement module includes a filter. The filter is configured to (i) determine whether one of the first matches corresponds to a same request signal as one of the second matches, (ii) drop the second match, (ii) commit the first match, and (iv) generate an acknowledgement signal based on the first match.

In other features, an access system is provided and includes line cards and crossbar modules. A first line card of the line cards is configured to (i) receive packets, and (ii) based on the packets, generate request signals. The crossbar modules are separate from the line cards. The crossbar modules include a first crossbar module and a second crossbar module. The first crossbar module includes a scheduler module. The second crossbar module is configured to transfer the packets between a pair of the line cards. The scheduler module is configured to schedule the transfer of the packets. The scheduler module includes queues configured to store the request signals for one or more of the line cards. At least one pruning module is configured to (i) monitor states of the queues, (ii) determine whether there is one or more available crossbar modules for the request signals, and (iii) forward the request signals when there is one or more available crossbar modules. At least one arbitration module is configured to arbitrate the request signals including selecting an order in which the request signals are forwarded from the at least one arbitration module. An acknowledgement module is configured to (i) receive the request signals from the at least one arbitration module, (ii) generate at least one acknowledgement signal based on the request signals, and (iii) forward the at least one acknowledgment signal to one or more of the line cards other than the first line card.

In other features, the request signals include a first request signal and a second request signal. The acknowledgment module includes a filter configured to: determine whether the first request signal is redundant with the second request signal; if the first request signal is redundant, drop the first request signal and generate an acknowledgement signal for the second request signal; and forward the second request signal to one of the line cards.

In other features, the at least one arbitration module includes: a first arbitration module configured to arbitrate the request signals including selecting an order in which the request signals are forwarded from the first arbitration module; and a second arbitration module configured to arbitrate the request signals including selecting an order in which the request signals are forwarded from the second arbitration module.

In other features, an access system is provided and includes line cards and crossbar modules. One of the line cards is configured to receive packets. The crossbar modules are separate from the line cards. The crossbar modules include a first crossbar module and a second crossbar module. The first crossbar module includes a scheduler module. The second crossbar module is configured to transfer the packets between a pair of the line cards. The scheduler module is configured to (i) schedule the transfer of the packets through the second crossbar module, and (ii) communicate with the line cards via control signals. Control packets in the control signals include respective first redundant bits. The scheduler module and the line cards add the first redundant bits to the control packets when generating respective ones of the control signals. One of the line cards is configured to (i) generate data signals to each include some of the packets, (ii) add second redundant bits to respective packets of the data signals, and (iii) transmit the data signals to the crossbar modules.

In other features, a first ratio of a first number of redundant bits in one of the control packets to a size of the one of the control packets is greater than a second ratio of a second number of redundant bits in one of the packets in the data signals to a size of the one of the packets in the data signals.

In other features, each of the control packets has a same number of redundant bits; and each of the packets in the data signals has a same number of redundant bits.

In other features, the line cards are configured to (i) generate request signals for transferring the packets, and (ii) add first redundant bits to each of the request signals. The scheduler module is configured to (i) generate acknowledgment signals based on the request signals, and (ii) add second redundant bits to each of the acknowledgment signals.

In other features, the line cards are configured to (i) receive packets, and (ii) based on the packets, generate request signals. The scheduler module is configured to generate acknowledgement signals based on the request signals. The control signals include the request signals and the acknowledgement signals.

In other features, an access system is provided and includes line cards and crossbar modules. One of the line cards is configured to receive packets. The crossbar modules are separate from the line cards. The crossbar modules include a first crossbar module and a second crossbar module. The first crossbar module includes a scheduler module. The second crossbar module is configured to transfer the packets between a pair of the line cards. The scheduler module is configured to (i) schedule the transfer of the packets through the second crossbar module, and (ii) communicate with the line cards via control signals. A first device is configured to (i) insert a control message between two packets or between two portions of a packet, and (ii) transmit the two packets and the control message or the two portions of the packet and the control message to a second device. The first device is one of the line cards or one of the crossbar modules. The second device is one of the line cards or one of the crossbar modules.

In other features, an access system is provided and includes line cards and crossbar modules. The line cards include a first line card and a second line card. The first line card is configured to receive a first packet. The crossbar modules are separate from the line cards and include a first crossbar module and a second crossbar module. The first crossbar module includes a scheduler module. The second crossbar module is configured to transfer the first packet between the first line card and the second line card. The scheduler module is configured to (i) schedule the transfer of the first packet through the second crossbar module, and (ii) communicate with the line cards via control signals. The first line card is configured to segment the first packet into packets prior to transmitting the packets to the second crossbar module. The second line card is configured to reassemble the packets to provide the first packet.

In other features, the scheduler module is configured to schedule transmission of the first packet prior to the transmission of a second packet through the second crossbar module. The second crossbar module transmits the second packet prior to transmitting a portion of the first packet. The second line card is configured to reassemble the first packet subsequent to receiving portions of the first packet.

In other features, an access system is provided and includes line cards and crossbar modules. The line cards include a first line card and a second line card. The first line card is configured to receive unicast packets and multicast packets. The crossbar modules are separate from the line cards and include a first crossbar module and a second crossbar module. The first crossbar module includes a scheduler module. The second crossbar module is configured to transfer the unicast packets and the multicast packets between the first line card and the second line card. The scheduler module is configured to schedule the transfer of the unicast packets along a path between the first line card and the second line card. The path includes the second crossbar module. The scheduler module is not configured to schedule the transfer of the multicast packets.

In other features, the first line card is configured to transmit one of a release signal and an allocation request to the scheduler module. The scheduler module is configured to, based on the one of the release signal and the allocation request, reserve the path for the multicast packets by delaying scheduled transmission of the unicast packets along the path.

In other features, the second crossbar module is configured to: store each of the multicast packets prior to transmitting each of the multicast packets; receive the unicast packets while transmitting the multicast packets; and interrupt transmission of one of the multicast packets or transmission of the multicast packets to transmit the unicast packets.

In other features, the second crossbar module is configured to: receive the multicast packets prior to receiving the unicast packets; and transmit the unicast packets along the path prior to transmitting multicast packets along the path.

In other features, the first line card is configured to: subsequent to receiving the multicast packets, transmit a request signal to the scheduler module to schedule transmission of the unicast packets; receive an acknowledgement signal from the scheduler module based on the request signal; and pause transmission of one or more of the multicast packets based on the acknowledgement signal to transmit the unicast packets.

In other features, the first line card is configured to: reserve the path for high-priority multicast packets by transmitting one of a release signal and an allocation request to the scheduler module; not reserve the path for low-priority multicast packets; and transmit the low-priority multicast packets along the path as bandwidth becomes available.

In other features, the first line card is configured to transmit the low-priority multicast packets along the path when at least one of: an acknowledgement signal has not been received for a unicast packet to be transmitted along the path; or the first line card does not have unicast packets to transmit along the path.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

In the drawings, reference numbers may be reused to identify similar and/or identical elements.

DESCRIPTION

Figure 1:
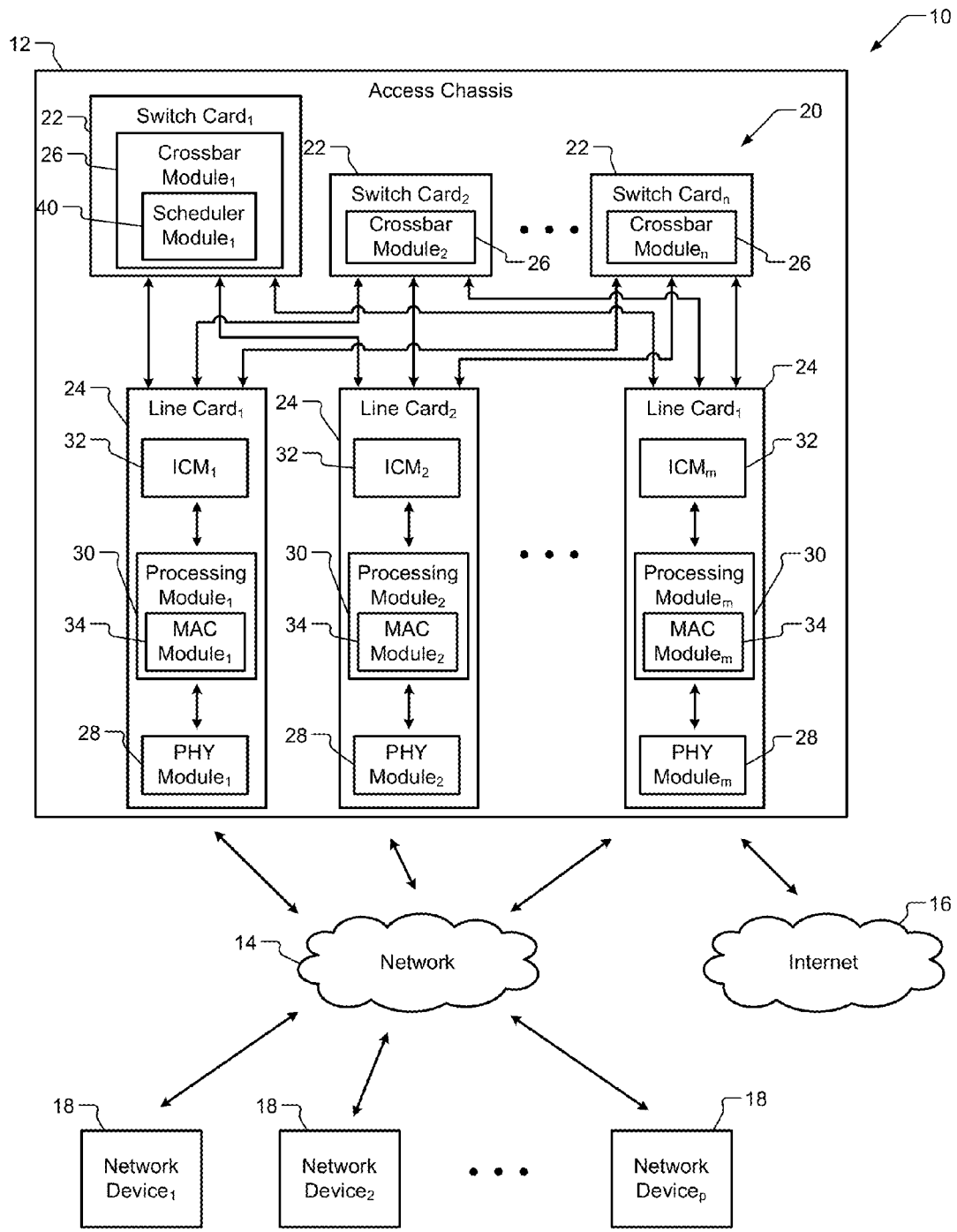
FIG. 1 is a functional block diagram of an access network incorporating an access system in accordance with an embodiment of the present disclosure.
Figure 2:
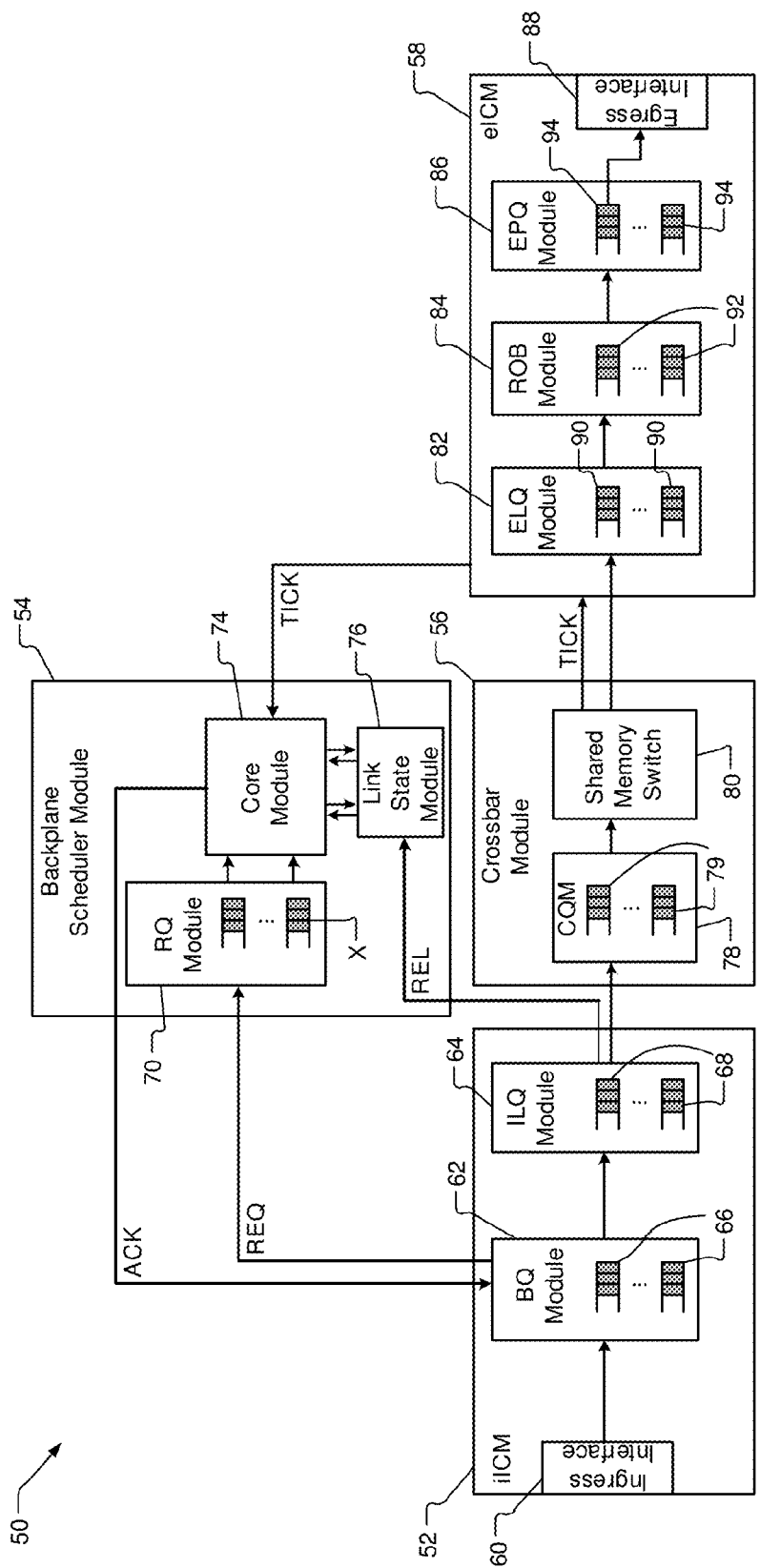
FIG. 2 is a functional block diagram of a portion of the access system of FIG. 1 illustrating single-stage scheduling in accordance with an embodiment of the present disclosure.
Figure 3:
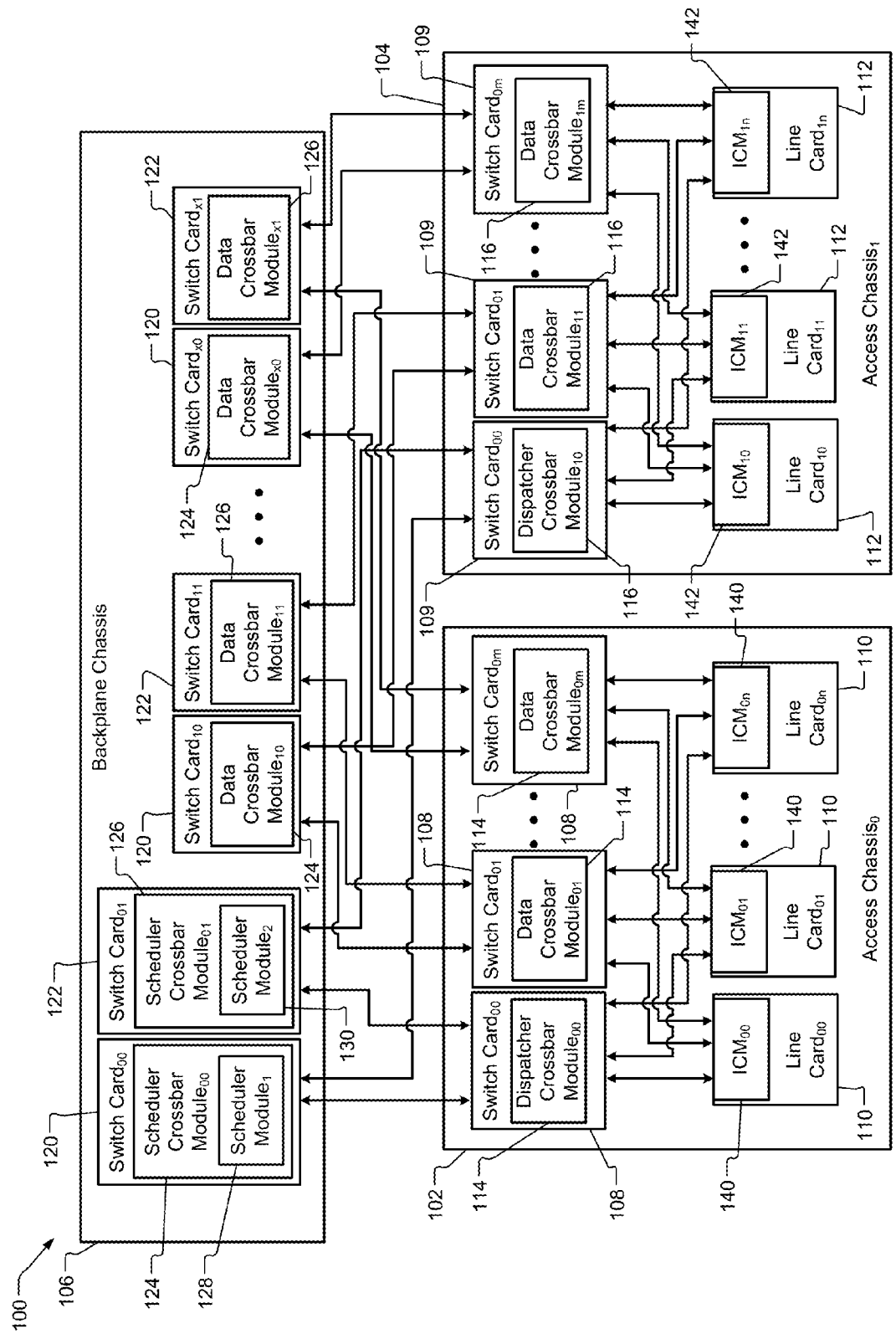
FIG. 3 is a functional block diagram an access system illustrating multi-stage scheduling in accordance with an embodiment of the present disclosure.

In the following examples, multiple access networks, access systems, and corresponding techniques are provided. A single-stage access system is shown in FIGS. 1-2. A multi-stage access system is shown in FIG. 3.

FIG. 1 illustrates one embodiment of an access network 10. The access network 10 includes a chassis 12, a network 14, an Internet 16, and network devices 18 (p network device are shown). The chassis 12 is connected to the network devices 18 via the network 14. The network 14 may be, for example, an Ethernet network. The term "chassis" as used herein refers to one or more chassis, which may each include a cabinet with slots for switch cards and/or line cards. The cabinet may be mounted inside a rack. The chassis 12 routes signals between the network devices 18 and/or between the network devices 18 and the Internet 16. The network devices 18 may include user devices, peripheral devices, and/or data storage devices. The user devices may include computers, cellular phones, set top boxes, televisions, etc.

The chassis 12 includes an access system 20 with switch cards 22 and line cards 24. Although n switch cards and m line cards are shown, the access system 20 may include any number of switch cards and line cards. Each of the switch cards 22 includes one or more crossbar modules 26. Each crossbar module disclosed herein may be a single chip or may be included with one or more other crossbar modules in a single chip. Each of the line cards 24 includes a physical layer (PHY) module 28, a processing module 30, and an interface control module 32 (referred to also as fabric interface controller). The PHY modules 28 may have any number of ingress and egress ports for transferring packets between the network 14 and the processing modules 30. The PHY modules 28 may be located and/or connected, for example, between medium access control (MAC) modules 34 and/or other higher layer modules in the line cards and chassis. The PHY modules 28 may also be located and/or connected between the network 14 or the Internet 16. The PHY modules 28 may refer to devices in a physical layer of the line cards and chassis. The MAC modules 34 may be located in the processing modules 30.

The processing modules 30 may each include a network processor and/or a packet processor. In operation, the processing module of a first line card may receive ingress packets from a PHY module and then determine to which line card (second line card), other than the first line card, the ingress packets are to be transferred. The processing module and/or a corresponding interface control module (ICM) may append a header to one or more of the ingress packets indicating an identifier of the second line card and/or an ICM of the second line card. The header may be, for example, a transmission control protocol (TCP) header.

Each of the line cards 24 may be referred to as an ingress line card or an egress line card. Each of the ICMs 32 may be referred to as an ingress ICM (iICM) or an egress ICM (eICM). The iICMs generate request signals to request transfers of packets to eICMs. Each of the request signals may include an identifier of an eICM and a size of the corresponding one or more packets. Each of the ICMs 32 may be connected to each of the crossbar modules 26 or to an assigned group of the crossbar modules 26 via high-speed links provided via a mesh network.

One or more of the crossbar modules 26 includes a scheduler module 40 (only one in the example shown). The other crossbar modules, which do not include a scheduler module, are referred to as data crossbar modules, as the purpose of these crossbar modules is to transfer data (packets) between pairs of the ICMs 32. The scheduler module 40 schedules transfers of packets to and from the crossbar modules 26 assigned to the scheduler module 40. In the example shown, the scheduler module 40 schedules transfers of packets between pairs of the ICMs 32 via the crossbar modules 26 and identifies selected ones of the links to transfer the packets. This includes scheduling of packet transfers for each of the crossbar modules 26 including the crossbar module in which the scheduler module 40 is located. The scheduler module 40 responds to the request signals with acknowledgement (ACK) signals. Each ACK signal indicates an identifier of one of the crossbar modules 26 for packets associated with that ACK signal and an eICM. The iICM receiving the ACK signal transfers the packets to the identified crossbar module according to the ACK signal. The iICM indicates the identifier of the crossbar module and the eICM in a header appended to one or more of the packets. The crossbar module then forwards the packets to the eICM according to the header.

The scheduler module 40 controls states of links between the line cards 24 and the crossbar modules 26 and controls flow of packets to and from the crossbar modules 26. Central allocation of links by the scheduler module 40 maintains fill levels of queues (sometimes referred to as buffers) in the crossbar modules 26 at low levels. Queues of a crossbar module are shown in FIG. 2. This prevents overflowing of the queues and in combination with the transfer of full packets to and from the crossbar modules 26 minimizes (i) the amount of memory used for reordering of packets, and (ii) the amount of reordering of packets prior to transmission from an eICM. The transfer of full packets prevents delays associated with segmentation of packets, reordering of packets, and/or reassembly of packets.

The access chassis 12 has a single-stage topology, which includes independent switch backplanes. The independent switch backplanes refer to the transfers of packets via assigned crossbar modules and corresponding backplane links (ingress and egress links of the crossbar modules). Each packet or set of packets is transferred between a pair of ICMs via a single assigned crossbar module. In the example implementation shown, none of the packets are transferred via more than one crossbar module. Each link between the ICMs 32 and the crossbar modules 26 is associated with one of the independent switch backplanes. Full connectivity is provided between any pair of the ICMs 32 through one of the independent switch backplanes. The switch backplanes are non-overlapping.

The scheduler module 40 stores states of each of the crossbar modules 26 and links between the ICMs 32 and the crossbar modules 26. The states of each of the crossbar modules 26 and links may be active or inactive (referred to also as available). The scheduler module 40 assigns a path between ICMs including corresponding links as available for newly received packets and generates ACK signals indicating identifiers of the links. The identifiers of each ACK signal include identifiers of (i) an ingress link between an iICM and a crossbar module, and (ii) an egress link between the crossbar module and an eICM. The ACK signal may also indicate when an iICM is to send one or more packets to a crossbar module.

FIG. 2 shows a portion 50 of the access network 10 of FIG. 1 and illustrates single-stage scheduling. The portion 50 includes an iICM 52, a scheduler module 54 (referred to also as a backplane scheduler module), a crossbar module 56, and an eICM 58. The iICM 52, the crossbar module 56 and the eICM 58 may, for example, replace two of the ICMs 32 and one of the crossbar modules 26 of FIG. 1. The scheduler module 54 may replace the scheduler module 40 of FIG. 1. Although the scheduler module 54 is described below with respect to two ICMs and a single crossbar module, the scheduler module 54 may perform similar functions with respect to additional ICMs and crossbar modules. Although the ICMs 52, 58 are referred to as an iICM and an eICM, each of the ICMs 52, 58 may be configured to operate as an iICM and/or an eICM.

The iICM 52 includes an ingress interface 60, a backplane queue (BQ) module 62, and an ingress link queue (ILQ) module 64. The ingress interface 60 receives packets from a network device via a network (e.g., the network 14 of FIG. 1).

The packets are transferred to and stored in queues 66 of the BQ module 62. Subsequent to receiving one or more packets, the BQ module 62 generates a request signal to forward the one or more packets to the eICM 58. The request signal is transmitted to the scheduler module 54. Based on the request signal, the scheduler module 54 generates and forwards an ACK signal to the iICM 52.

The ILQ module 64 includes queues 68 and, in response to the ACK signal, forwards the packet from the BQ module 62 to the crossbar module 56. The ILQ module 64 may transmit a release signal to the scheduler module 54 in response to the packet being transmitted to the crossbar module 56. The release signal may be transmitted in response to the ACK signal and indicates forwarding of the packets associated with the request signal to the crossbar module 56. The release signal may indicate an identifier of the crossbar module 56 and a collective size of the packets forwarded to the crossbar module 56.

The scheduler module 54 includes a request queue (RQ) module 70 with queues 72, a core module 74, and a link state module 76. The queues 72 of the RQ module 70 store the request signals received from the BQ module 62. The core module 74 schedules the transfer of the request signals based on statuses of (i) a link between the iICM 52 and the crossbar module 56, and (ii) a state of a link between the crossbar module 56 and the eICM 58. The core module 74 generates an ACK signal identifying the links, which is forwarded to the BQ module 62. The core module 74 arbitrates the request signals based on links available and generates the ACK signal. The iICM 52, based on the ACK signal, selects a packet from a corresponding queue in the BQ module 62 and forwards the packet on a single link to the crossbar module 56. The packet may be self-routing in that the packet has a header prepended by the iICM 52. The header indicates the links the packet is to be forwarded on and the crossbar module 56 the packet is to be passed through prior to being received at the eICM 58. The header also includes an identifier of the eICM 58. For this reason, the crossbar module 56 does not need any a priori information identifying what route the packet is to follow.

The link state module 76 tracks states of the links and stores link status values indicating whether the links are active, inactive and/or available. This information may be updated, for example, when an ACK signal is sent from the core module 74 to the BQ module 62. The states of the links may also indicate load states of the links including how long each link is to be occupied. This may be based on sizes of packets being transferred. The core module 74 and/or the link state module 76 track scheduled packets, the links on which the packets are being transferred, the sizes of the packets, etc.

The crossbar module 56 includes a crossbar queue (CQ) module 78 and a shared memory switch (SMS) 80. The CQ module 78 includes queues 79 that stores packets received from the iICM 52. The SMS 80 routes the packets received from the iICM 52 to the eICM 58. The SMS 80 may receive packets from other iICMs and forward the packets to the eICM 58 or to other eICMs. The crossbar module 56 (i) determines a fill level of one of the queues 79, and (ii) in response to the fill level of the queue being different than a predetermined level, sends a first status message TICK to the eICM 58 and/or corresponding line card. The predetermined level may be at least one of (i) equal to a status value stored in the scheduler module 54, or (ii) set based on a size of one or more sets of packets corresponding to the request signal. The eICM 58 (i) forwards the first status message TICK to the scheduler module 54, or (ii) generates a second status message based on the first status message TICK and transmit the second status message to the scheduler module 54. The scheduler module 54 is configured to adjust the status value based on the first status message TICK or the second status message. This allows the status value to be increased or decreased (rounded up or down) depending upon the state of the queue and to maintain accuracy of the status value for the link between the crossbar module 56 and the eICM 58. This aids in maintaining the status value when the size of the packets stored in the queue is different than the status value, as stored in the scheduler module 54.

The eICM 58 includes an egress link queue (ELQ) module 82, a reorder buffer (ROB) module 84, an egress port queues (EPQ) module 86, and an egress interface 88. Each of the modules 82, 84, 86 include respective queues 90, 92, 94. The ELQ module 82 receives packets from the SMS 80 and forwards the packets to the ROB module 84. The ROB module 84 reorders the packets if needed. Although a single crossbar module is shown, multiple crossbar modules may be connected between the iICM 52 and the eICM 58. As such, the ROB module 84 may receive more than one packet from the iICM 52, via two or more crossbar modules. The speeds of the crossbar modules may be different, such that a first packet is received subsequent to a second packet, where the second packet was transmitted subsequent to the first packet. This may result in the packets being received at the ROB module 84 in an incorrect order. The ROB module 84 may then reorder the packets. The reordered packets are forwarded to the EPQ module 86 and then to the egress interface 88.

FIG. 3 shows an access system 100 and illustrates multi-stage scheduling. The access system 100 includes two or more access chassis 102, 104 (or single stage chassis) and a backplane chassis 106 (or second stage chassis). The backplane chassis 106 may be connected to the first stage chassis via wires.

Each of the access chassis 102, 104 include a first stage of switch cards 108, 109 and line cards 110, 112. The switch cards 108, 109 include respective and crossbar modules 114, 116. The backplane chassis 106 includes a second stage of switch cards 120, 122 with respective crossbar modules 124, 126. First ones of the crossbar modules 124, 126 (e.g., scheduler crossbar modules$_{00,\ 01}$) include respective scheduler modules 128, 130. The remaining crossbar modules (or data crossbar modules$_{10\text{-}x0,\ 11\text{-}x1}$) of the backplane chassis 106 are allocated for transmitting data packets.

Each of the line cards 110 has access to each of the crossbar modules 114. Each of the line cards 112 has access to each of the crossbar modules 116. The first crossbar modules (identified as scheduler crossbar modules$_{00,10}$) in each of the access chassis 102, 104 (identified as dispatcher crossbar modules$_{00,10}$) may be allocated for (i) transmitting request signals and release signals to the scheduler modules 128, 130, and (ii) receiving ACK signals from the scheduler modules 128, 130. Each of the line cards 110, 112 and/or corresponding ICMs 140, 142 may transmit packets via the remaining crossbar modules (identified as data crossbar modules$_{01\text{-}0m,\ 11\text{-}1m}$) in the access chassis 102, 104 to the backplane chassis 106. As an example, a first access chassis$_0$ is shown and includes a dispatcher crossbar module$_{00}$ and data crossbar modules$_{01\text{-}0m}$, where m is an integer greater than or equal to 1. The data crossbar modules$_{10\text{-}x0,\ 11\text{-}x1}$ of the backplane chassis 106 may then forward the packets to the appropriate crossbar modules in the line cards 110, 112 and/or ICMs 140, 142.

The second stage of crossbar modules 124, 126 of the backplane chassis 106 are divided into sets of crossbar modules. The backplane chassis 106 may include, for example, x sets of crossbar modules, where x is an integer greater than or equal to 1. As shown, each of the sets of crossbar modules includes a pair of crossbar modules (e.g., the pair of crossbar modules$_{10,\,11}$, ..., the pair of crossbar modules$_{00,\,x1}$). The sets of crossbar modules may include any number of crossbar modules. In the example shown, the backplane chassis 106 includes scheduling crossbar modules$_{00,\,01}$ and data crossbar modules$_{10\text{-}x0,\,11\text{-}x1}$. Each of the sets of crossbar modules includes two or more scheduler crossbar modules or two or more data crossbar modules. Each of the crossbar modules in one of the sets of crossbar modules is connected to a respective crossbar module in each of the access chassis 102, 104. For example, the crossbar modules$_{10,\,11}$ are each connected to the crossbar module$_{01}$ in the first access chassis 102 and the crossbar module$_{11}$ in the second access chassis 104.

As shown, each crossbar module in the first set of crossbar modules$_{00,\,01}$ may include a scheduler module (e.g., scheduler modules 128, 130). Each of the scheduler modules 128, 130 may schedule the transmission of packets through respective crossbar modules in the other sets of crossbar modules (e.g., crossbar modules$_{10,\,11\,\ldots\,x0,\,x1}$). This scheduling may be based on request signals received from the line cards 110, 112 and link availability of the respective crossbar modules$_{10,\,11\,\ldots\,x0,\,x1}$. For example, the first scheduler module 128 (scheduler module$_1$) in the first set of crossbar modules$_{00,\,01}$ may schedule transmission of packets through selected and available links of the first crossbar modules$_{10\text{-}x0}$ in each of the other sets of crossbar modules$_{10,\,11\,\ldots\,x0,\,x1}$.

In operation, each of the scheduler modules 128, 130 tracks and controls state for each link of the crossbar modules (e.g., respective data crossbar modules in each of the respective chassis 102, 104, 106) assigned to that scheduler module. The scheduler modules 128, 130 may allocate links for newly received full packets when the activity states of the links are at low levels (less than a predetermined level of traffic). The central allocation of links by the scheduler modules 128, 130 aids in minimizing fill levels of queues in the data crossbar modules of the chassis 102, 104, 106. This combined with the switch control of full packets through the data crossbar modules$_{01\text{-}0m,\,10\text{-}1m,\,10\text{-}x0,\,11\text{-}x1}$ minimizes the amount of reordering of the packets in an eICM, which minimizes memory requirements of an eICM.

The first stage and the second stage of crossbar modules 114, 116, 124, 126 may be referred to as having a "folded-clos" or "clos-network" topology that interconnects many devices and/or modules in a communication system. The first stage and the second stage provide independent switch backplanes. Each backplane refers to one or more paths of crossbar modules and links through which data is transferred between ICMs. Each crossbar module in the first stage and each corresponding set of crossbar modules in the second stage are associated with a different switch backplane. Each of the switch backplanes provides full connectivity (conductive path) between a pair of ICMs (e.g., between a first ICM of a first line card and a second ICM of a second line card). Each crossbar module and link of a crossbar module is allocated to a single switch backplane. As a result, the switch backplanes are non-overlapping (i.e. do not share a crossbar module and/or a link).

One or more of the switch backplanes is configured as a control backplane. In the example show, two control backplanes are provided. Each of the control backplanes includes the dispatcher crossbar modules$_{00,\,01}$ and one of the scheduler modules 128, 130.

The ICMs 140, 142 may each operate as iICMs and/or eICMs. While operating as an iICM, packets request signals are forwarded by the iICM to a respective one of the dispatcher crossbar modules$_{00,\,01}$ in the first stage. The dispatcher crossbar module performs load balancing of request signals to a respective one of the scheduling crossbar modules$_{00,\,01}$ in the second stage. Each of the scheduler modules 128, 130 controls a single switch backplane, tracks states of the crossbar modules, links in that switch backplane, and allocates links for the transmission of packets between an iICM and an eICM. The non-overlapping switch backplanes prevent resource conflicts between the scheduler modules 128, 130. The scheduler modules 128, 130 generate ACK signals in response to request signals and forward the ACK signals to the iICMs that originated the request signals. Each ACK signal may identify a full path from the corresponding iICM to the corresponding eICM. Each ACK signal may include identifiers of the links, crossbar modules and eICM of the corresponding path. The identifiers of the crossbar modules may include identifiers of a first stage (or ingress) crossbar module, a second stage crossbar module, and another first stage (or egress) crossbar module.

An iICM, in response to receiving an ACK signal, selects a packet from a BQ module (e.g., BQ module 62 of FIG. 2) of the iICM and forwards the packet to the allocated crossbar module of the first stage. The packet is then forwarded along the assigned path via other links and crossbar modules in the path to an eICM. The packet is self-routing as the packet has a header identifying the links, crossbar modules and eICM in the path.

Figure 4:
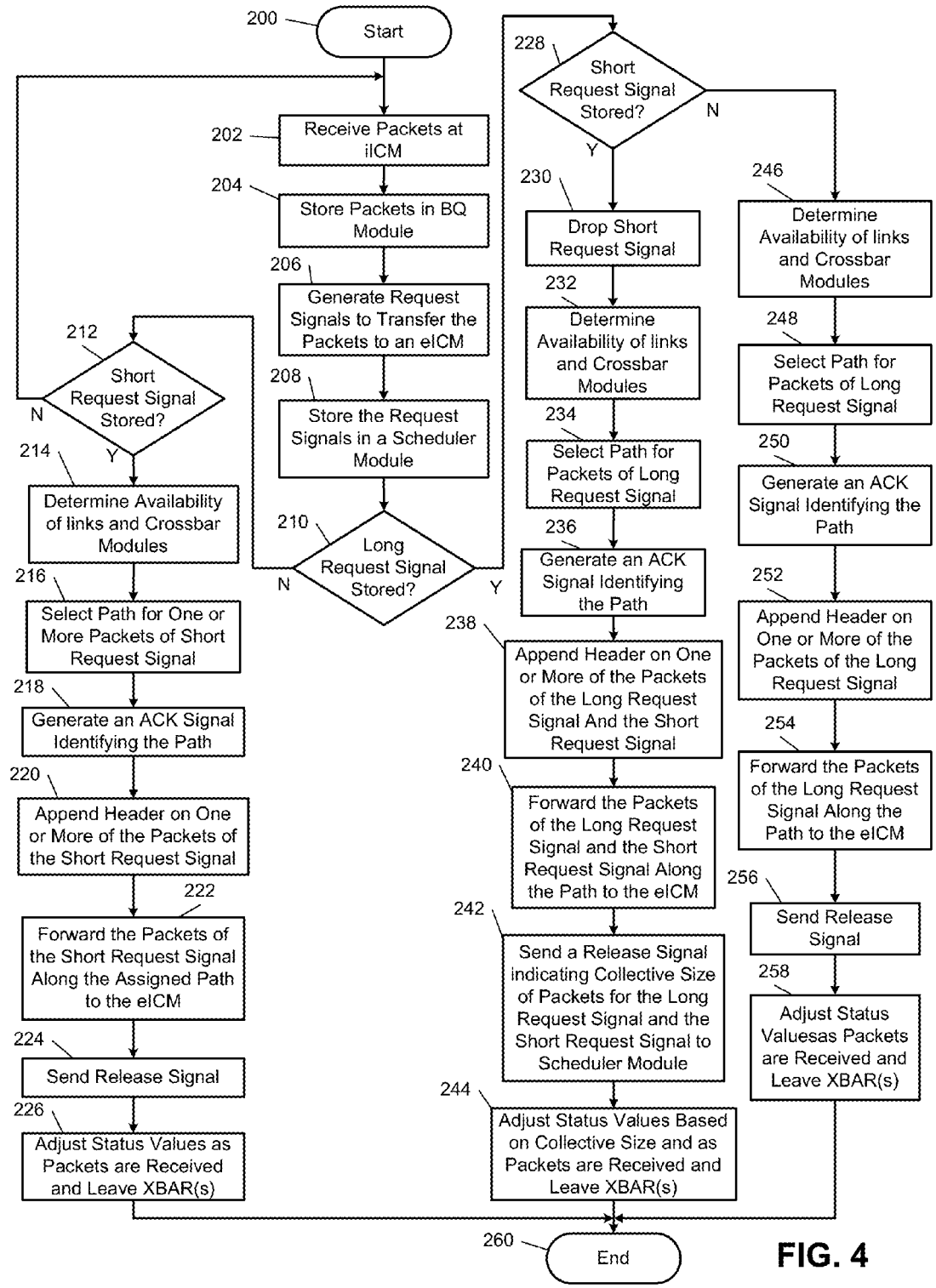
FIG. 4 illustrates a method of operating an access system in accordance with an embodiment of the present disclosure.

The access systems disclosed herein may be operated using numerous methods, one example method is illustrated in FIG. 4. Although the following tasks are primarily described with respect to the implementations of FIGS. 1-3, the tasks may be easily modified to apply to other implementations of the present disclosure. The tasks may be iteratively performed. Although the following tasks are primary described with respect to a single iICM and a single eICM, the tasks may be performed for any number of iICMs and eICMs.

The method may begin at 200. At 202, an iICM (e.g., iICM 52) receives one or more packets from a network device. At 204, the one or more packets are stored in a BQ module (e.g., the BQ module 62).

At 206, the iICM generates one or more request signals, as described above, to have the packets transferred to an eICM (e.g., the eICM 58) and forwards the one or more request signals to a scheduler module (e.g., one of the scheduler modules 54, 128, 130). The iICM may be on a different line card than the eICM.

At 208, the request signals are stored in the scheduler module, as described herein. At 210, a core module (e.g., core module 74) of the scheduler module determines whether a long request signal has been received and is stored in the core module. A long request signal referring to a request signal associated with (i) a number of packets greater than or equal to a predetermined number of packets (or a full set of packets) and/or (ii) a data length of one or more packets being greater than or equal to a predetermined data length. If a long request signal has not been received, task 212 is performed, otherwise task 228 is performed.

At 212, the core module determines whether a short request signal has been received and is stored in the core module. A short request signal may refer to a request signal associated with (i) a single packet, (ii) a number of packets less than the predetermined number of packets, and/or (iii) a data length of one or more packets being less than the predetermined data length. If a short request signal has been received, task 214 is performed, otherwise task 202 may be performed. As an alternative to returning to task 202, the method may end at 260.

At 214, the link state module (e.g., link state module 76) may determine availability of links and crossbar modules for the one or more packets of the short request signal.

At 216, the core module selects a path for the one or more packets including assigning links and one or more crossbar modules for the one or more packets.

At 218, the core module generates an ACK signal for the one or more packets. The ACK signal identifies the path including IDs of the links, the one or more crossbar modules, and the eICM. An ACK signal of a short request signal may be referred to as a short ACK signal.

At 220, the iICM, BQ module and/or an ILQ module (e.g., the ILQ module 64) appends a header on each of one or more of the packet(s) associated with the short request signal based on the ACK signal.

At 222, the iICM forwards the packets of the short request signal along the assigned path to the eICM by forwarding the packets to a crossbar module in the assigned path.

At 224, the iICM module transmits a release signal to the link state module in response to forwarding the packets to the crossbar module. The release signal may indicate the overall length of the packets transmitted to the first crossbar module. A release signal of a short ACK signal may be referred to as a short release signal.

At 226, the link state module adjusts status values for the links and one or more crossbar modules in the path based on the release signal. Subsequent to task 226, the method may end at 260 as shown or return to task 202.

At 228, the core module determines whether there has been a short request signal received prior to the long request signal and is stored in the core module. If a short request signal is stored in the core module, task 230 is performed, otherwise task 246 is performed.

At 230, the core module drops the short request signal.

At 232, the link state module may determine availability of links and crossbar modules for the packets associated with the long request signal.

At 234, the core module selects a path for the packets associated with the long request signal including assigning links and one or more crossbar modules for the packets.

At 236, the core module generates an ACK signal for the packets associated with the long request signal. The ACK signal identifies IDs of the links, the one or more crossbar modules, and the eICM in the path. An ACK signal of long request signal may be referred to as a long ACK signal.

At 238, the iICM, the BQ module and/or the ILQ module appends a header on each of one or more of the packets associated with the long request signal and the short request signal based on the ACK signal.

At 240, the iICM forwards the packets of the short request signal and the long request signal along the assigned path to the eICM by forwarding the packets to a crossbar module in the assigned path determined at 234.

At 242, the iICM module transmits a release signal to the link state module in response to forwarding the packets at 240. The release signal may indicate the overall length of the packets associated with the short request signal and the long request signal. A release signal of long ACK signal may be referred to as a long release signal.

At 244, the link state module adjusts status values for the links and one or more crossbar modules in the path based on the release signal. Subsequent to task 244, the method may end at 260 as shown or return to task 202.

At 246, the link state module may determine availability of links and crossbar modules for the packets of the long request signal.

At 248, the core module selects a path for the packets associated with the long request signal including assigning links and one or more crossbar modules for the packets.

At 250, the core module generates an ACK signal for the packets associated with the long request signal. The ACK signal identifies the path including IDs of the links, the one or more crossbar modules, and the eICM.

At 252, the iICM, the BQ module and/or the ILQ module appends a header on each of one or more of the packet(s) associated with the short request signal based on the ACK signal.

At 254, the iICM forwards the packets associated with the long request signal along the assigned path to the eICM by forwarding the packets to a crossbar module in the assigned path determined at 248.

At 256, the iICM module transmits a release signal to the link state module in response to forwarding the packets to the crossbar module. The release signal may indicate the overall length of the packets transmitted at 254.

At 258, the link state module adjusts status values for the links and one or more crossbar modules in the path based on the release signal. Subsequent to task 258, the method may end at 260 as shown or return to task 202.

The above-described tasks are meant to be illustrative examples; the tasks may be performed sequentially, synchronously, simultaneously, continuously, during overlapping time periods or in a different order depending upon the application. Also, any of the tasks may not be performed or skipped depending on the implementation and/or sequence of events.

Scheduling

Figure 5:
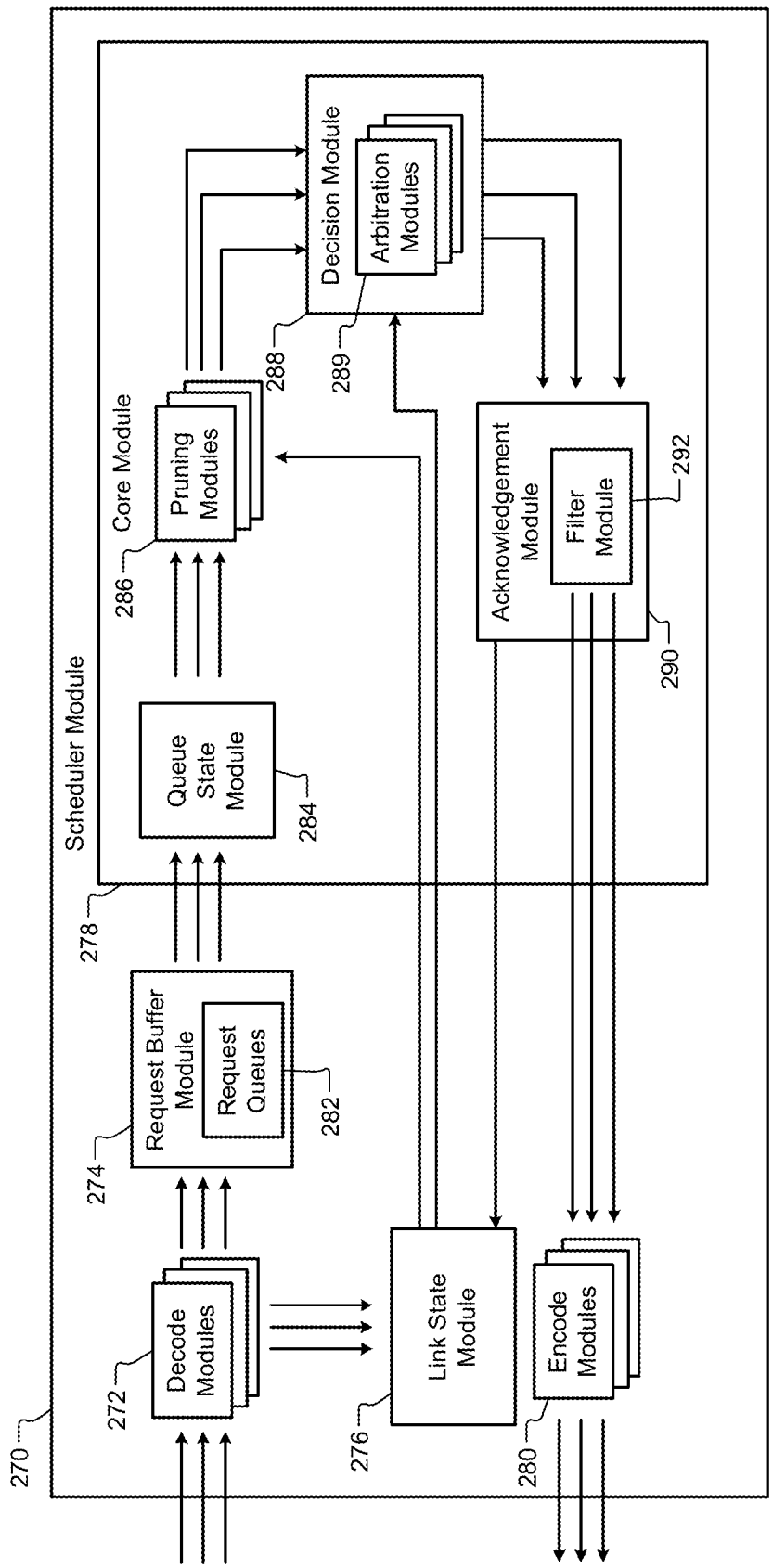
FIG. 5 is a functional block diagram of a scheduler module in accordance with an embodiment of the present disclosure.

FIG. 5 shows a scheduler module 270. The scheduler module 270 may replace any of the scheduler modules disclosed in FIGS. 1 and 2. The scheduler module 270 includes decode modules 272, a request buffer module 274, a link state module 276, a core module 278, and encode modules 280. The decode modules 272 receive and decode request signals and release signals from iICMs. The decode modules 272 forward the decoded request signals to the request buffer module 274 and the decoded release signals to the link state module 276.

The request buffer module 274 includes request queues 282 for storing the decoded request signals. The request buffer module 274 forwards queue status signals and the decoded request signals to the core module 278. The queue status signals indicate the state of the request queues 282 and whether there are short request signals and/or long request signals stored in the request queues 282.

The core module 278 includes a queue state module 284, pruning modules 286, one or more decision modules 288 with arbitration modules 289, and an ACK module 290. The queue state module 284 receives the queue status signals and the decoded request signals and determines presence of long request signals and short request signals in the request queues 282.

Each of the pruning modules 286 determines whether a path between ICMs, including crossbar module links, is available for packets of one of the request signals. This is determined based on a link status signal received from the link state module 276. The link status signal indicates whether a path between ICMs, including crossbar module links, is available for packets associated with the request signal. If a path is available, the corresponding pruning module forwards the request signal to one of the arbitration modules 289. As a result, the pruning modules perform filtering of request signals based on link availability.

The decision module 288 arbitrates request signals received from two or more of the pruning modules 286 via the arbitration modules 289 and selects paths for packets associated with the request signals. As an example, decision module 288 and/or each of the arbitration modules 289 may include multiple inputs and multiple outputs and may select a request signal on one of the inputs to be forwarded to any one of the outputs. The decision module 288 and/or each of the arbitration modules 289 may perform as a "round-robin" device and cycle through the respective inputs providing one of the request signals on a selected input to a selected one of outputs at a time. Each time a request signal is forwarded to one of the outputs, the remaining outputs may be maintained in a null or negative state. The decision modules select paths for the request signals passed through the arbitration modules and generate matches. Each match may identify a request signal, an iICM, an eICM, a corresponding path, and/or IDs of links of the path. Operation of the decision modules is further described with respect to FIGS. 6-8.

The ACK module 290 generates ACK signals based on the matches received from the decision module 288. The ACK module 290 may include a filter module 292 to filter out redundant ACK signals. Two or more of the pruning modules 286 may monitor the same request queues of the request buffer module 274. As a result, multiple ACK signals may be generated for the same request signal. The filter module 292 drops (or deletes) redundant ACK signals. This is further described with respect to FIG. 7. The encode modules 280 encode ACK signals received from the ACK module 290 prior to transmission to the iICMs from which the request signals originated.

Figure 6:
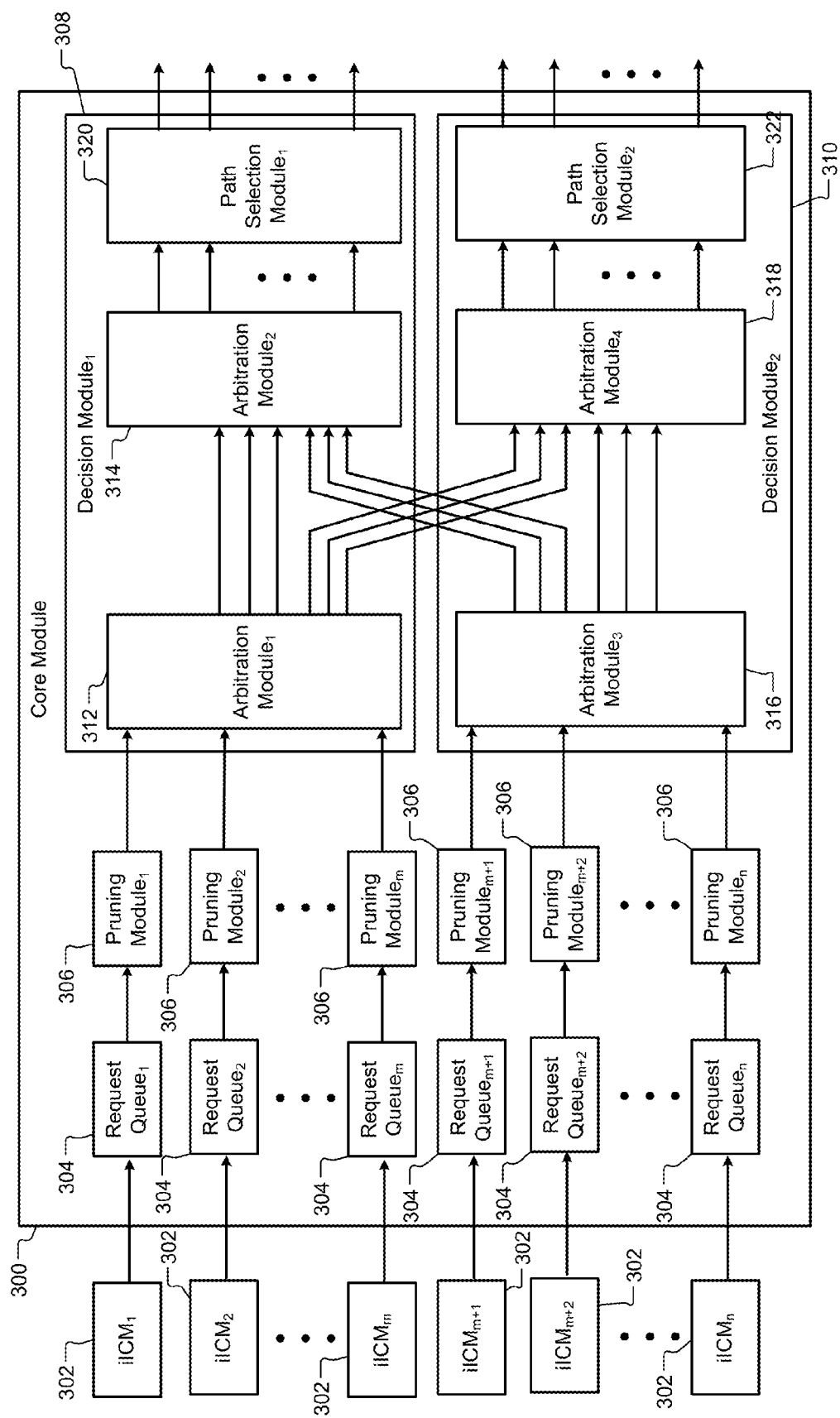
FIG. 6 is a functional block diagram of a core module illustrating use of multiple sets of arbitration modules in accordance with an embodiment of the present disclosure.

FIG. 6 shows a core module 300 illustrating use of multiple sets of arbitration modules. The core module 300 may receive control signals, such as request signals and release signals, from multiple iICMs 302. The core module 300 includes request queues 304, pruning modules 306, and decision modules 308, 310. The core module 300 may receive the control signals at respective sets of the request queues 304 and the pruning modules 306 (e.g., the request queues$_{1-m}$ and the pruning modules$_{1-m}$ and/or the request queues$_{(m+1)-n}$ and the pruning modules$_{(m+1)-n}$). The first set including request queues$_{1-m}$ and pruning modules$_{(m+1)-n}$. The second set including request queues$_{(m+1)-n}$ and pruning modules$_{(m+1)-n}$. The sets of request queues and pruning modules may correspond to sets of serially connected arbitration modules in the decision modules 308, 310, as shown. Each of the decision modules 308, 310 may include any number of arbitration modules. In the example shown, each of the decision modules 308, 310 includes two arbitration modules (arbitration modules 312, 314 and arbitration modules 316, 318) and a path selection module (one of path selection modules 320, 322). The first set includes arbitration modules$_{1-2}$. The second set includes arbitration modules$_{3-4}$. Each of the pruning modules 306 forwards a request signal stored in a corresponding one of the request queues 304 when a path for corresponding packets associated with the request signal is available. The path may include: a link between an iICM of the request signal and a crossbar module; one or more links between crossbar modules; and a link between a crossbar module and an eICM.

The first arbitration modules$_{1,3}$ in the sets of arbitration modules may perform as "round-robin" devices cycling through the signals received from corresponding ones of the pruning modules 306 at first inputs of the first arbitration modules$_{1,3}$. The first arbitration modules$_{1,3}$ may select the signals and/or first inputs in succession, in a random order, in a predetermined order, or in another suitable order. The first arbitration modules$_{1,3}$ may then forward the received request signals to first outputs of the first arbitration modules$_{1,3}$ for transmission to the second arbitration modules$_{2,4}$. The first outputs of the first arbitration modules$_{1,3}$ may be selected in succession, in a random order, in a same or different order than the first inputs of the first arbitration modules$_{1,3}$ were selected, or in another suitable order. Each of the outputs of the first arbitration modules$_{1,3}$ may be forwarded to any of the second inputs of the second arbitration modules$_{2,4}$.

The second arbitration modules$_{2,4}$ have second inputs that receive the request signals from the first arbitration modules$_{1,3}$. The second arbitration modules$_{2,4}$ select the second inputs in succession, in a predetermined order, in a random order, or in another suitable order. The second arbitration modules$_{2,4}$ may forward the request signals from the second inputs to second outputs of the second arbitration modules$_{2,4}$ in succession, in a predetermined order, in a random order, in a same or different order in which the second inputs were selected, or in another suitable order. The second arbitration modules$_{2,4}$ may reverse the selection order performed by the first arbitration modules$_{1,3}$.

Each of the first arbitration modules$_{1,3}$ (may be referred to as an iICM arbitration module) and selects one request signal from one of the request queues 304 and/or pruning modules 306 per iICM. Each of the second arbitration modules$_{2,4}$ (may be referred to as an eICM arbitration module) selects one request signal for each eICM. The arbitration modules 312-318 and the path selection modules 320-322 may assign request signals to a path such that each request signal from an iICM is forwarded to a single eICM. Each iICM may be assigned a different path to a respective eICM. The paths may be non-overlapping (i.e. not share a link between an iICM and a crossbar module, a link between crossbar modules, and/or a link between a crossbar module and an eICM).

Figure 7:
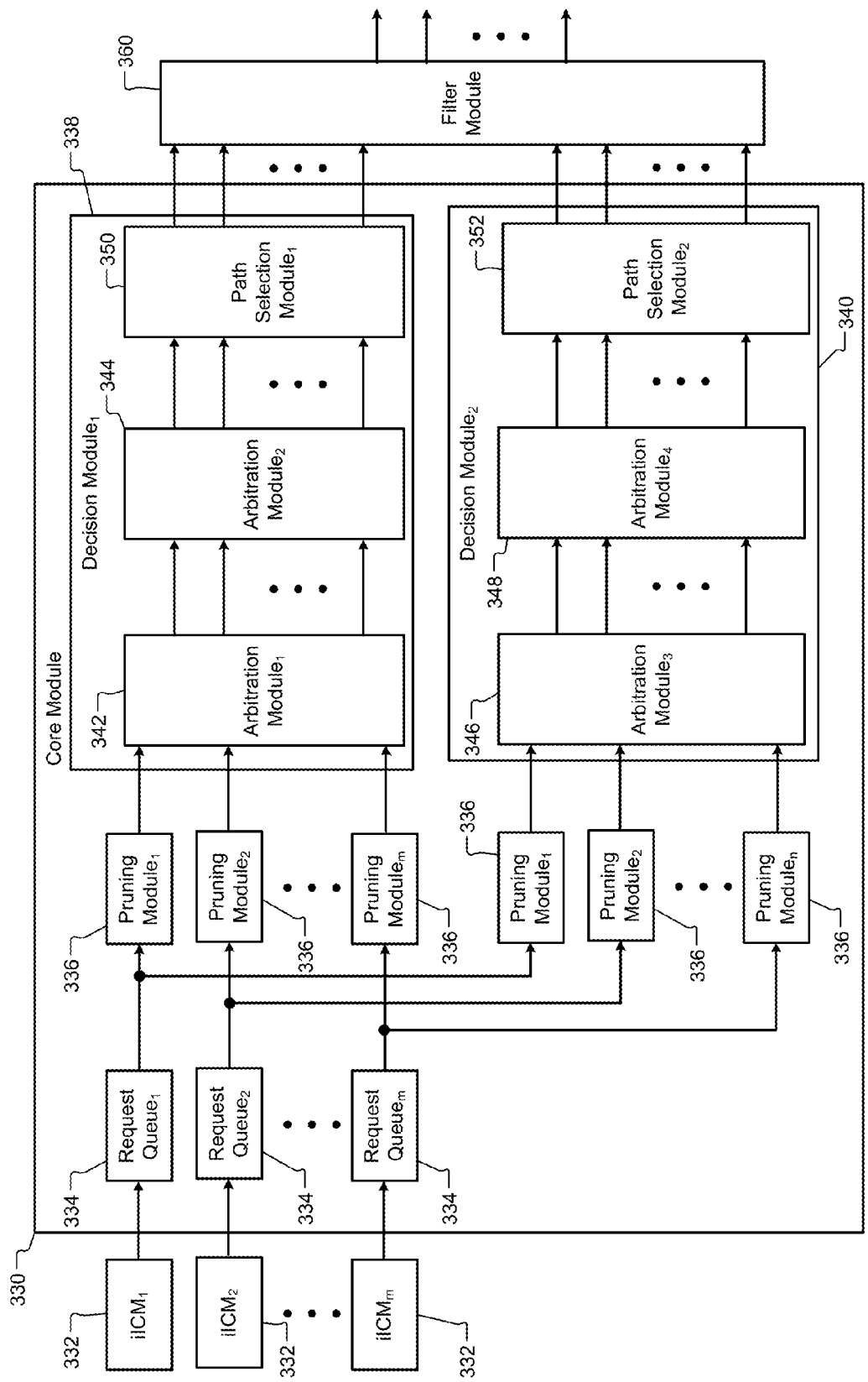
FIG. 7 is a functional block diagram of a core module illustrating dual monitoring of request signals and filtering of acknowledgement signals in accordance with an embodiment of the present disclosure.

FIG. 7 shows a core module 330 illustrating dual monitoring of request signals and filtering of acknowledgement signals. The request signals are provided by iICMs 332 to request queues 334 and may be monitored by pruning modules 336 and then forwarded to decision modules 338, 340. The decision modules 338, 340 may each include arbitration modules 342, 344 and 346, 348 and path selection modules 350, 352 and may operate similar to the decision modules 308, 310 of FIG. 6.

A filter module 360 may be provided to filter redundant matches generated by the path selection modules 350, 352. A redundant match is generated when two matches are generated for the same request signal. The filter 360 commits one of the two matches and drops the other of the two matches.

Figure 8:
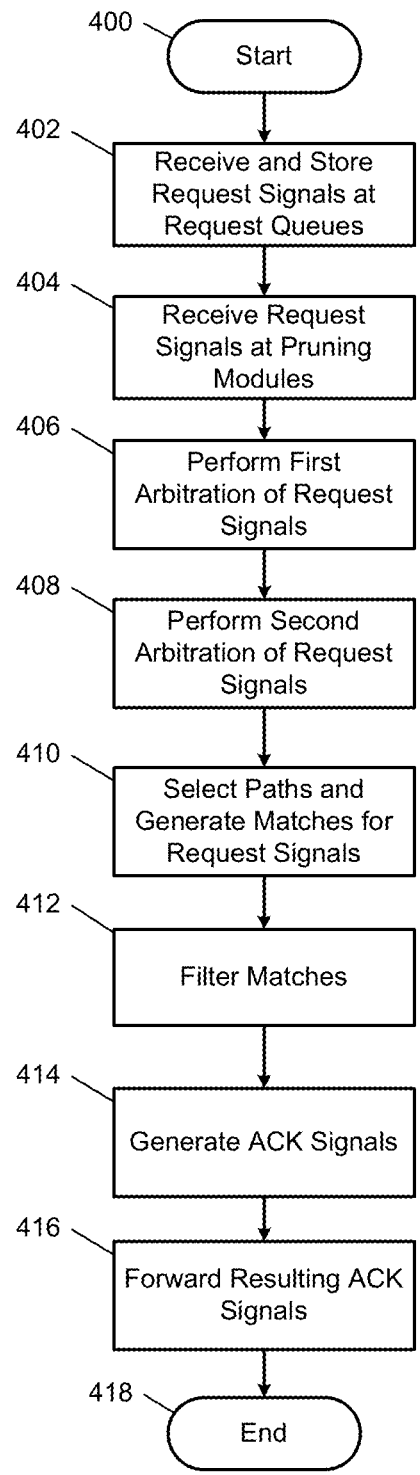
FIG. 8 illustrates a method of operating a core module in accordance with an embodiment of the present disclosure.

The core modules disclosed herein may be operated using numerous methods, one example method is illustrated in FIG. 8. Although the following tasks are primarily described with respect to the implementations of FIGS. 5-7, the tasks may be easily modified to apply to other implementations of the present disclosure. The tasks may be iteratively performed.

The method may begin at 400. At 402, request queues (e.g., 282, 304, 334) receive request signals from iICMs and store the request signals. At 404, pruning modules (e.g., pruning modules 286, 306, 336) receive the request signals and forward selected ones of the request signals based on path availability.

At 406, first arbitration modules (e.g., arbitration modules 312, 316 or arbitration modules 342, 346) may arbitrate request signals received from the pruning modules, as described above. At 408, second arbitration modules (e.g., arbitration modules 314, 318 or arbitration modules 344, 348) serially connected to respective ones of the first arbitration modules may arbitrate request signals received from the first arbitration modules. Any one of tasks 406 or 408 may not be performed and/or addition arbitration tasks may be performed if additional arbitration modules are included.

At 410, path selection modules (e.g., path selection modules 320, 322, 350, 352) select a path for each of the request signals received from one of the arbitration modules, as long as a path is still available. The path selection modules generate a match when a path is available as described above. At 412, a filter module (e.g., the filter module 360) may remove redundant matches generated at 410.

At 414, an acknowledgment module (e.g., acknowledgement module 290) may generate an ACK signal for each of the matches received from the path selection modules and/or from the filter. The ACK signals may be transmitted to the respective iICMs from which the corresponding request signals originated. The method may end at 416.

The above-described tasks are meant to be illustrative examples; the tasks may be performed sequentially, synchronously, simultaneously, continuously, during overlapping time periods or in a different order depending upon the application. Also, any of the tasks may not be performed or skipped depending on the implementation and/or sequence of events.

The above-described systems include line cards, ICMs, crossbar modules, and switch cards that are connected to each other via links. Due to the amount of data being passed on the links, the links may be serializer/deserializer (serdes) links to increase bandwidth. Each of the line cards, ICMs, crossbar modules, and switch cards may include serializer/deserializer modules or instantiations for transmitting data and/or deserialzer/serialzer modules or instantiations for receiving data. The serializer/deserializer instantiations and the deserialzer/serialzer instantiations may be distinct modules or may be included in other modules. As a result, the signals transmitted on the links, including control signals and data signals, may be serial signals.

The links that transfer control signals are referred to as control links. The links that transfer data packets are referred to as data links. Each of the links including control links and data links may transfer information entities in succession. Each of the information entities may include sets of information. As an example, an information entity for a control link transferring a short request may include a packet length and an identifier of a destination eICM. As another example, an information entity for a control link transferring a long request may include an identifier of a destination eICM. As yet another example, an information entity for a control link transferring a release signal may include a packet length and an identifier of one or more links. An information entity of short ACK signal and/or a long ACK signal may include an identifier of an eICM and an identifier of one or more links. Other examples of information entities are provided throughout this application.

The above-described scheduler modules allocate selected ones of the links for packet transmissions between pairs of the line cards. At least one switch card is "passed" when transferring a packet between a pair of line cards. The passing of a switch card refers to the transfer of the packet through a crossbar module of the switch card.

Each scheduler module may be a distinct chip. Each of the scheduler modules and/or core modules within the scheduler modules may include multiple instances. An instance may refer to an algorithm, a module and/or a software program. Multiple instances may be executed or operated in parallel. This improves the number of ACKs that can be generated by a scheduler module.

Each of the instances can allocate across a predetermined set of the links. The sets of links of the instances are non-overlapping. In other words, each set of links does not share or have a same link. This allows the instances to be implemented in parallel, since the instances are using different system resources (e.g., links, crossbar modules, etc.) to transfer packets. Multiple instances may monitor the same request queues, as similarly described above with respect to FIG. 6. As a result two instances may be implemented in parallel and to generate two ACK signals for a request signal in a request queue. The filter may be used to remove a redundant ACK signal and corresponding resource allocations.

To avoid having scheduler instances from operating in a lock-stepped behavior, where the instances generate identical ACKs in lock steps, the arbitration modules may be set to select received request signals and/or arbitration module inputs in random orders. The random state of each arbitration module may be different than the random state for each other arbitration module. The random selection of received request signals and/or arbitration module inputs can be performed at regular or random intervals. As another example, the received request signals and/or arbitration module inputs for one or more of the arbitration modules may be randomly selected for a first period of time and be selected in a non-random order for a second period of time. Also, to further avoid a lock-step behavior, the arbitration modules may be hard-coded to use a different order of inputs. For example, a first arbitration module in a first instance may use a (0, 1, 2, 3, 4 . . . ) order and a first arbitration module in a second instance may use a (2, 0, 4, 3 . . . ) order, where the values of each order refer to a corresponding input of each arbitration module.

Multi-Chip Scheduler

As described above, each of the scheduler modules may allocate links for packet transmission between a pair of ICMs. Line cards of iICMs send request signals to the scheduler module, which then respond to the line cards with ACK signals. Each of the ACK signals has one or more identifiers of one or more links on which packets are to be transmitted. To increase the number of ACKs generated by the scheduler module for a period of time, the request signals (referred to as the "state") may be split up and provided to multiple scheduler chips. The scheduler module may have multiple instances, as described above. Each of the scheduler chips may have one of the instances. Each of the instances may receive a portion of the state.

Each of the instances can allocate a set of links. The sets of links are non-overlapping. None of the links are in more than one of the sets of links. The instances work in parallel by using non-overlapping resources.

In one implementation, dispatcher crossbar modules are used to transfer scheduled packets. The dispatcher crossbar modules do not schedule the transfer of the packets, but rather load distributes request signals from one or more line cards across instances of a scheduler module, scheduler chips, and/or scheduler modules. Load balancing requests may be performed per iICM such that requests from the same iICM are provided to the same scheduler module.

Collapsing without Collapsing

"Collapsing without collapsing" refers to the aggregating of unicast packets having a same eICM identifier and/or egress port identifier to form a single packet or single set of packets. The iICM may generate a single request signal for the single aggregated packet or set of packets and transmit the request signal to a scheduler module (e.g., one of the scheduler modules). The scheduler module may then generate an ACK signal based on the request signal. The iICM may then transmit the single aggregated packet or set of packets in response to the ACK signal and generate a release signal. The release signal may indicate a collective size of the single aggregated packet or set of packets. The release signal is transmitted to the scheduler module for link status updating purposes.

By performing collapsing without collapsing, unicast packets are grouped and treated as a single packet by the scheduler module. This reduces the number of request signals transmitted to, stored in, and handled by the scheduler module.

Asymmetric Forward Error Correction

The above-described ICMs, crossbar modules, and scheduler modules may use asymmetric forward error correction (FEC) to decrease latencies of control signals and increase bandwidth of data signals. Asymmetric FEC, as disclosed herein, includes operating in a first mode and a second mode. The ICMs, crossbar modules, and scheduler modules may operate in the first mode while operating in the second mode.

The first mode refers to (i) operation of iICMs and scheduler modules and/or crossbar modules in which the scheduler modules are located, and (ii) control signals and corresponding first links on which the control signals are sent between the iICMs and the scheduler modules. This includes the control signals (e.g., request signals and release signals) sent from the iICMs to the scheduler modules and control signals (e.g., ACK signals) sent from the scheduler modules to the iICMs. The first mode includes transmitting the control signals using FEC. Prior to transmitting the control signals, a first predetermined amount of redundant data is appended to each control packet in the control signals. The redundant data is added for error correction and to prevent bit errors. As an example, a control packet may include 512 bits of information and 32 redundant bits. The redundant bits may include cyclical redundancy check (CRC) bits.

The second mode refers to (i) operation of the iICMs and crossbar modules, and (ii) data signals and corresponding second links on which the data signals are sent between the iICMs and the crossbar modules. The number of second links is greater than the number of first links. Also, the data signals are sent subsequent to the iICMs receive respective ACK signals. The second mode includes transmitting the data signals using FEC. Prior to transmitting the data signals, a second predetermined amount of redundant data is appended to each of the data packets. The second predetermined amount of redundant data may be less than, equal to or greater than the first predetermined amount of redundant data. As an example, a data packet may include 2 kilo-bits of information and 32 redundant bits. The redundant bits may include CRC bits.

The control signals have a high-level of overhead and a low-level of FEC latency as compared to the data signals, due to (i) the smaller number of control signals, and (ii) the larger amount of redundant data added to each control packet in the control signals relative to the size of the control packets. The data signals have a low-level of overhead and a high-level of FEC latency, due to (i) the larger number of data signals, and (ii) the smaller amount of redundant data added to each data packet relative to the size of the data packets. For these reasons, a first ratio of a first number of redundant bits in one or more of the control packets of the control signals to a size of the one or more control packets is greater than a second ratio of a second number of redundant bits in one or more of the data packets to a size of the one or more data packets.

The asymmetric FEC of the control signals and the data signals decreases overall latency associated with a signal path that includes control links and data links because a low-level of FEC latency is used on the control links. Low bandwidth overhead is provided because the data links have low FEC overhead and most of the links in the signal path are data links.

Transparent Message Insertion

Figure 9:
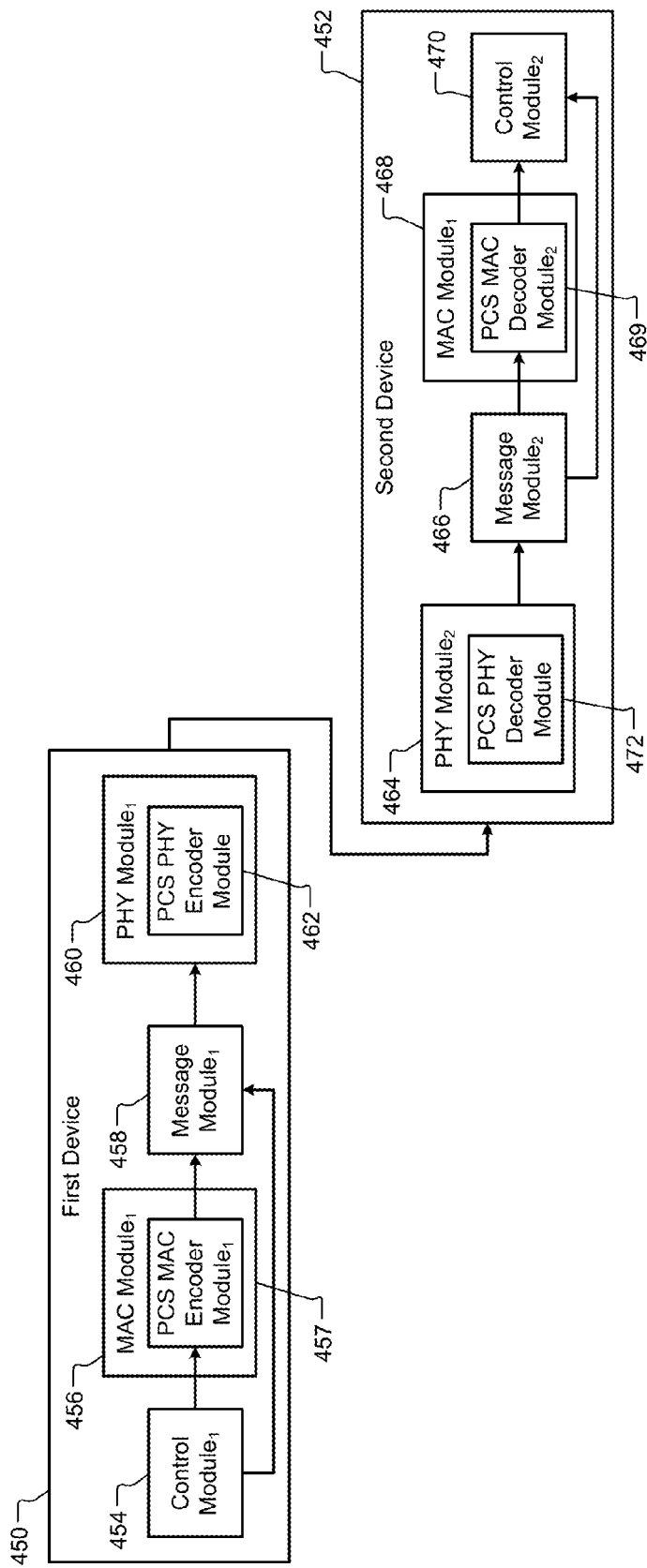
FIG. 9 is a functional block diagram of multiple devices illustrating transparent message insertion in accordance with the present disclosure.

FIG. 9 shows multiple devices 450, 452 communicating with each other and collectively providing transparent message insertion. Each of the multiple devices 450, 452 may be one of the ICMs, crossbar modules, and/or scheduler modules disclosed herein. The first device 450 may include a first control module 454, a first medium access control (MAC) module 456, a first message module 458, and a first PHY module 460.

The first control module 454 may forward packets to the MAC module 456 for transmission to the second device 452. The packets may be control packets or data packets. The first MAC module 456 may include a physical coding sublayer (PCS) MAC encoder module 457 that encodes. The packets may be transferred from the first MAC module 456 on corresponding links using one or more MAC protocols. The links may be control links or data links.

In one implementation, the first control module 454 signals the first message module 458 to insert a control message in one or more of the encoded packets, and/or between two or more of the encoded packets. In another implementation, the first message module 458 generates and inserts a control message in one or more of the encoded packets and/or between two or more of the encoded packets. The first message module 458 may be located in the first PHY module 460, the first MAC module 456 and/or between the first PHY module 460 and the first MAC module 456, as shown. The encoded packets and the control message are then forwarded from the first message module 458 to the first PHY module 460.

The first PHY module 460 may include a PCS PHY encoder module 462 for encoding the encoded packets and the control message (referred to collectively as the encoded signal). The first PHY module 460 transmits the encoded signal to the second device 452. The PCS PHY encoder module 462 may execute a PSC protocol in addition to serdes operations performed by the first PHY module 460. The PCS protocol supports control characters (e.g., each control character being 8 bits or 10 bits in length), control words (e.g., each control word being 64 bits or 66 bits in length), etc.

The second device 452 includes a second PHY module 464, a second message module 466, a second MAC module 468 and a second control module 470. The second PHY module 464 receives the encoded signal. The second PHY module 464 may include a PCS decoder module 472 that decodes the collective signal to provide the encoded packets and the control message. The second message module 466 detects and removes the control message from the encoded packets and forwards the encoded packets to the second MAC module 468. The control message may be forwarded to the second control module 470. The second message module 466 may be located in the second PHY module 464, the second MAC module 468 and/or between the second PHY module 464 and the second MAC module 468, as shown. The second MAC module 468 may execute a MAC protocol (e.g., a packet transmission protocol) that does not support control messages. For this reason, the control message is removed prior to the packets being received by the second MAC module 468. The second MAC module 468 may include a PCS MAC decoder module 469 that decodes the packets received from the second message module 466.

The transparent message insertion technique described above provides low-latency for messages transferred between devices and/or corresponding control modules. The transparent message insertion technique includes (i) transferring a control message by inserting a control byte or a control word not used by a MAC protocol into packets of a MAC data flow, and (ii) transmitting the control message with the packets. At a receiving end (e.g., at the second device 452) the control byte or control word is detected and the control message is extracted and deleted from the MAC data flow. The second MAC module 468 does not receive the control message. In one implementation, transmission of a long packet is interrupted to insert the control message. A long packet may be a packet having a length greater than a predetermined length. An example length of a long packet is 9 kilo-bytes. A first portion of the packet is transmitted, followed by the control message, followed by a second portion of the packet.

Packet De-Collapsing

Figure 10:
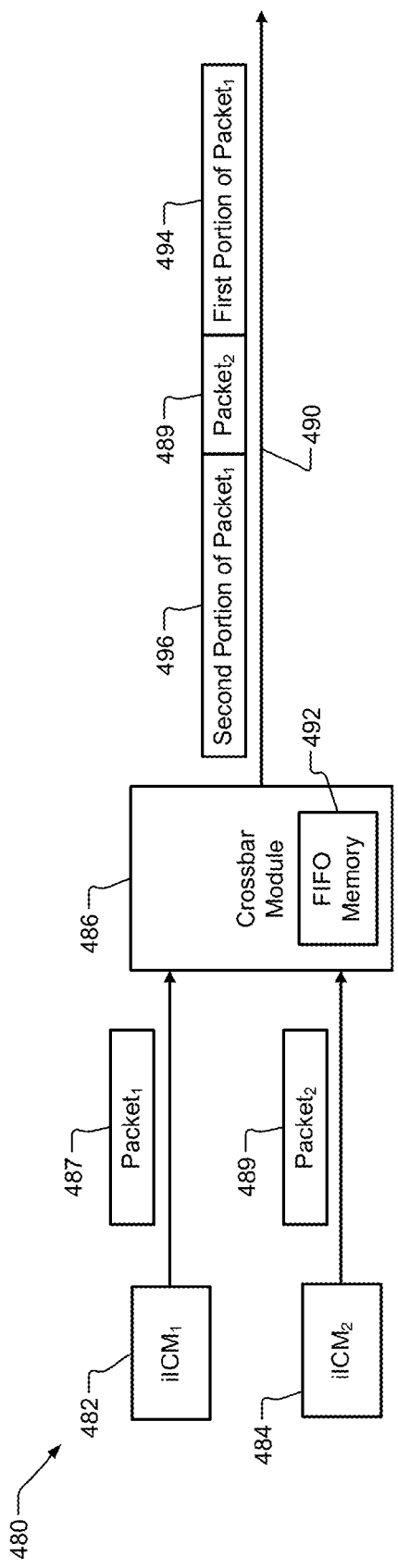
FIG. 10 is a functional block diagram of a portion of a chassis illustrating packet interruption in accordance with an embodiment of the present disclosure.

FIG. 10 shows a portion 480 of an access chassis (e.g., one of the access chassis 12, 102, 104 of FIGS. 1 and 3) illustrating packet interruption. The portion 480 includes iICMs 482, 484, and a crossbar module 486. The crossbar module 486 may receive a first packet 487 from the first iICM 482 and a second packet 489 from the second iICM 484. The first packet 487 may be a long packet having a length greater than a first predetermined length. The second packet 489 may be a short packet having a length less than a second predetermined length. The first predetermined length may be greater than or equal to the second predetermined length. Although a scheduler module may perform packet scheduling to prevent oversubscription of an egress link of the crossbar module 486, a delay in transmission of the second packet can occur due to, for example, jitter. Oversubscription refers to the scheduling of a same link for the transmission of more than one packet at the same time.

Oversubscription may occur when a scheduler module (e.g., any one of the scheduler modules disclosed herein) schedules the first packet 487 to be transmitted on an egress link 490 of the crossbar module 486 and then schedules the second packet 489 to be transmitted on the same egress link 490. The egress link 490 is connected between the crossbar module 486 and an eICM. Oversubscription may also occur, for example, when the second packet 489 is scheduled prior to the first packet 487, but (i) transmission of the second packet 489 from the first iICM is delayed, and/or (ii) reception of the second packet 489 by the crossbar module 486 is delayed. The crossbar module 486 may store the packets 487, 489 as the packets 487, 489 are received in a single first-in-first-out (FIFO) memory 492. For this reason, the first packet 487 may be stored in the FIFO memory 492 prior to the second packet 489.

The crossbar module 486 may receive the second packet 489 subsequent to receiving a first portion of the first packet 487 or subsequent to initiating transmission of the first packet 487. To prevent the short packet from being delayed by a full length and/or a portion of the long packet, the crossbar module 486 may pause transmission of the first packet 487 and transmit the second packet 489. The transmission of the first packet 487 may be continued upon transmitting the second packet 489. In the example shown, a first portion 494 of the first packet 487 is transmitted, followed by the second packet 489, followed by the second portion 496 of the first packet 487. This minimizes a maximum delay a short packet can be delayed through the crossbar module 486. As a result, the maximum delay for transmission of the second packet 489 from the crossbar module 486 may be a length of the first portion 494 of the first packet 487. The scheduler module may not be aware of the pausing and continuing of the transmission of the first packet 487.

In one implementation, the crossbar module 486 adds a header to the first portion 494 and/or the second portion 496 of the first packet 487 prior to transmitting the first portion 494 and/or the second portion 496. The portions 494, 496 are forwarded from the crossbar module 486 in the order in which the portions 494, 496 are received. The headers may each indicate lengths of each of the portions 494, 496, number of portions of the first packet 487, an identifier of the first packet 487, an identifier of one or more crossbar modules, an identifier of an eICM, and/or an identifier of an egress port of an eICM.

The crossbar module 486, which may replace any crossbar module disclosed herein, may segment unicast packets having a length greater than a predetermined length (e.g., 1024 bits) to reduce impact on backplane latency for high-priority unicast packets. Portions (or chunks) of a unicast packet may be transmitted as multiple unicast packets from an ILQ module on a link between an iICM and a crossbar module. The original unicast packet may be divided into any number of unicast packets. The iICM may generate a release signal indicating an amount of time taken to transmit the multiple unicast packets. The release signal may be transmitted to a scheduler module, as described above. The iICM may add a header to one or more of the unicast packets transmitted to the crossbar module 486. The header may indicate lengths of each of the portions and/or unicast packets, number of portions and/or unicast packets, an identifier of the corresponding original unicast packet, an identifier of one or more crossbar modules, an identifier of an eICM, and/or an identifier of an egress port of an eICM. In one implementation, one or more of the portions and/or unicast packets includes CRC bits.

Figure 11:
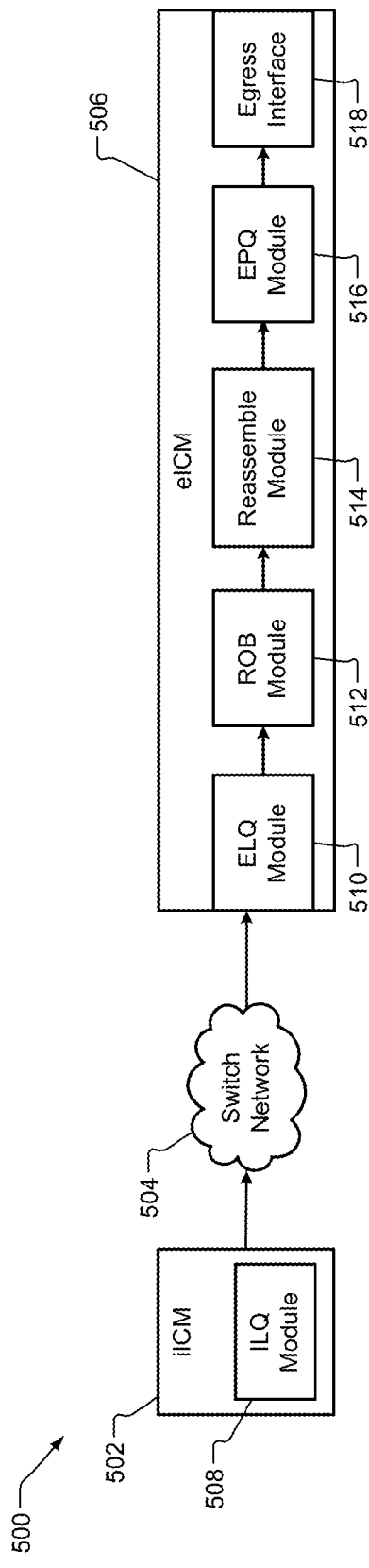
FIG. 11 is a functional block diagram of a portion of an access network for packet reordering and reassembly in accordance with an embodiment of the present disclosure.

FIG. 11 shows a portion 500 of an access network for packet reordering and reassembly. The portion 500 of the access network includes an iICM 502, a switch network 504, and an eICM 506. The iICM 502 includes an ILQ module 508 that stores data packets for transmission to the eICM 506 via the switch network 504. The switch network 504 includes one or more crossbar modules, as disclosed herein. The eICM 506 includes an ELQ module 510, a ROB module 512, a reassemble module 514, an EPQ module 516 and an egress interface 518. The ELQ module 510 stores packets received from the switch network 504. Due to, for example, packet de-collapsing and/or packet segmentation, the ROB module 512 may reorder packets (e.g., unicast packets) stored in the ELQ module 510 based on the headers of the packets. The reassemble module 514 reassembles the reordered packets to form originally transmitted packets based on the headers. The EPQ module 516 controls transmission of the reassembled packets from the egress interface 518. As a result, the proper reordering of packets is performed in the eICM 506 and a long packet and/or segmented packet is fully reassembled prior to transmission of the packets from the egress interface 518.

Multicast

Figure 12:
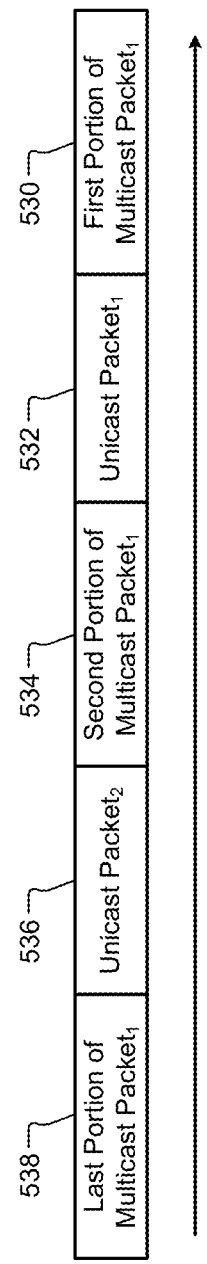
FIG. 12 is a diagram illustrating packet segmentation in accordance with an embodiment of the present disclosure.

FIG. 12 shows a diagram illustrating packet segmentation. An iICM may insert and/or interleave one or more unicast packets in a multicast transmission. Unicast packets may be referred to as high-priority packets and multicast packets may be referred to as low-priority packets. Transmission of multicast packets may be paused to transmit one or more unicast packets. This prevents unicast packets from being delayed by multicast packets. FIG. 12 shows an example transmission of a single multicast packet and two unicast packets. A first portion 530 of the multicast packet is transmitted followed by the first unicast packet 532. A second portion 534 of the multicast packet is then transmitted followed by the second unicast packet 536. A third portion 538 of the multicast packet is then transmitted. Unicast packets may not be interleaved by a multicast packet. A single multicast packet may be transmitted on a link at a time. Put another way, multiple multicast packets may not be transmitted on a link at the same time.

Each multicast packet is stored in its entirety in a crossbar module prior to being transmitted from the crossbar module. This is referred to as store-and-forwarding of multicast packets. The store-and-forwarding of multicast packets allows crossbar modules to interrupt transmission of multicast packets. An iICM may forward a multicast packet on one or more links to one or more crossbar modules when the iICM does not have unicast packets to forward on the one or more links. If the iICM receives an ACK signal for transmission of unicast packets on the one or more links while multicast packets are being transmitted on the one or more links, then the iICM may interrupt the transmission of the multicast packets to transmit the unicast packets. A minimum amount of bandwidth may not be provided on the links of a crossbar module for multicast packets due to unicast interruption of the multicast packets.

Multicast packets may have different priority levels. Transmission of a low-priority multicast packet may be paused to allow transmission of a high-priority multicast packet. As such, the transmission of the high-priority multicast packet is finished prior to transmission of the low-priority multicast packet.

A scheduler module, such as one of the above-described scheduler modules, monitors links to obtain utilization information and uses the utilization information to schedule unicast packets. The unicast information includes traffic activity statuses of the links. The scheduler module may not use the utilization information to schedule multicast packets, but rather may delay transmission of unicast packets based on the utilization information.

Multicast packets may have a same multicast identifier and may follow a same path from an iICM to one or more eICMs. The iICM does not send request signals to a scheduler module for transmission of the multicast packets, but rather transmits the multicast packets when there is available bandwidth on the allocated path. The iICM may send a release signal to the scheduler module to indicate transmission of one or more multicast packets and the length of the one or more multicast packets. The scheduler module may then update status values associated with links of the allocated path of the multicast packets and adjust transmission of unicast packets accordingly.

Figure 13:
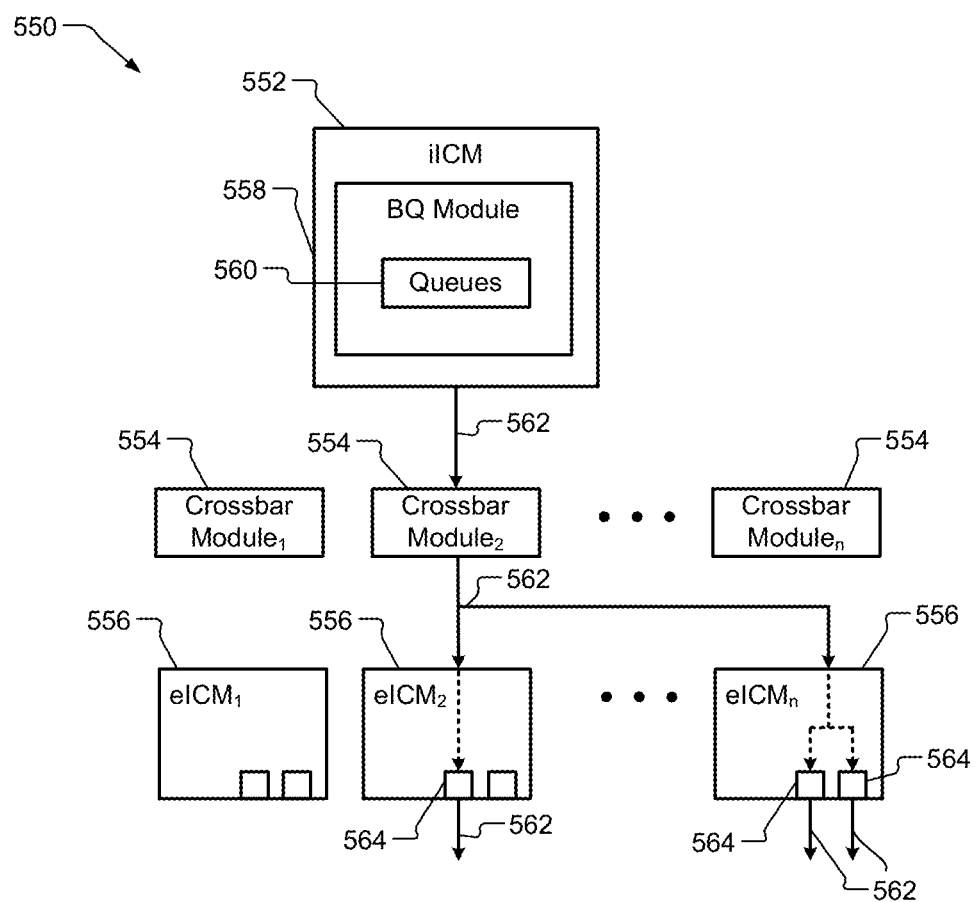
FIG. 13 is a functional block diagram of a portion of an access network illustrating multicast packet transmission in accordance with an embodiment of the present disclosure.

FIG. 13 shows a portion 550 of an access network illustrating multicast packet transmission. The portion 550 of the access network includes an iICM 552, crossbar modules 554, and eICMs 556. The iICM 552 includes a BQ module 558 with queues 560 for storing request signals. An example path (shown by arrows 562) allocated for transmission of multicast packets is shown by arrows. Although the path is allocated for transmission of multicast packets, portions and/or all of the path may be used for transmission of respective unicast packets.

The architecture of the access network may be referred to as a push architecture, as a scheduler module is not used to schedule transmission of the multicast packets. The multicast packets are received and are transmitted along the path based on a multicast identifier in headers of the multicast packets. The iICM 552 may transmit the multicast packets based on the multicast identifier to one of the crossbar modules (e.g., the crossbar module$_2$). The multicast identifier may be included in a header of the multicast packet. The crossbar module may transmit the multicast packets to eICMs$_{2,n}$ based on the multicast identifier. Egress links of the crossbar module may be set based on the multicast identifier. The eICMs may set egress ports based on the multicast identifier.

The iICM 552, the crossbar module$_2$, the eICMs$_{2,n}$, and egress ports 564 in the path may each include a table relating multicast identifiers with link identifiers, output port identifiers, and/or destination identifiers. As an example, the table in the iICM 552 may provide an identifier of the link between the iICM 562 and the crossbar module$_2$ and/or corresponding output port of the iICM 552 through which the multicast packets are to be transmitted. As another example, the table stored in the crossbar module$_2$ may include identifiers of the links between the crossbar module$_2$ and the eICMs$_{2,n}$ and/or corresponding output ports of the crossbar module$_2$ through which the multicast packets are to be transmitted. As yet another example, the table stored in the eICMs$_{2,n}$ may include identifiers of one or more egress ports from which the multicast packets are to be transmitted.

No reordering of the multicast packets is needed in the eICMs$_{2,n}$ due to the ordered transmission of the multicast packets and/or portions of the multicast packets along the same path. A maximum bandwidth associated with one multicast identifier may be a transmission rate of a single link (e.g., 25 giga-bits per second).

The iICM 552 may include two types of queues. A first type of queues may be dedicated to a specific multicast identifier. A second type of queues may not be dedicated to a specific multicast identifier and may store multicast packets having different multicast identifiers. The first type of queues may be used when performing "packet collapsing". The second type of queues may be used when not performing packet collapsing. With respect to multicast packets, packet collapsing refers to the aggregating of packets having a same multicast identifier to form a single packet or set of packets. The iICM 552 may generate a single allocation request and/or release signal for the single aggregated packet or set of packets. The allocation request signal and/or release signal may indicate a collective size of the single aggregated packet or set of packets.

Two classes of service may be provided for multicast packets. One for high-priority multicast packets, and another for low-priority (or best effort) multicast packets. Backplane links may be reserved for high-priority multicast packets, similar to unicast packets. Backplane links may not be reserved for low-priority multicast packets.

An iICM that receives a high-priority multicast packet may generate an allocation request and transmit the allocation request to a scheduler module. The scheduler module stores full link path identifiers per multicast identifier and based on a multicast identifier of the high-priority multicast packet may delay use of a corresponding path by unicast packets. This allows the iICM to transmit the high-priority multicast packet. Links in the path of the high-priority multicast packet are not allocated by the scheduler module, but rather use of the links for unicast packets is delayed. In contrast, the iICM may not generate an allocation request signal for low-priority multicast packets, but rather forwards the low-priority multicast packets along the corresponding path as bandwidth is available (i.e. not being used for unicast packets and/or high-priority multicast packets).

The above-described transmission of multicast packets provides spatial replication at an iICM, a crossbar module and/or an egress module with the transmission of a multicast packet: from an iICM to multiple crossbar modules; from a crossbar module to multiple crossbar modules and/or to multiple eICMs; and/or within an eICM to multiple egress ports of the eICM. The path, associated with a multicast identifier, may have a static configuration, as the path does not change. The multicast packets of the multicast identifier follow the same backplane links. This prevents a need for reordering of the multicast packets at an eICM. A maximum bandwidth of a multicast flow may be based on serial link speeds (e.g., 25 giga-bits per second) of one or more links in a path of the multicast flow.

The multicast packets are fully buffered in the crossbar modules without "cut-through". The term cut-through referring to the passing of a packet through a module without storage of the packet in the module. As an example, cut-through may be performed for unicast packets to prevent delay in the transfer of the unicast packets.

Figure 14:
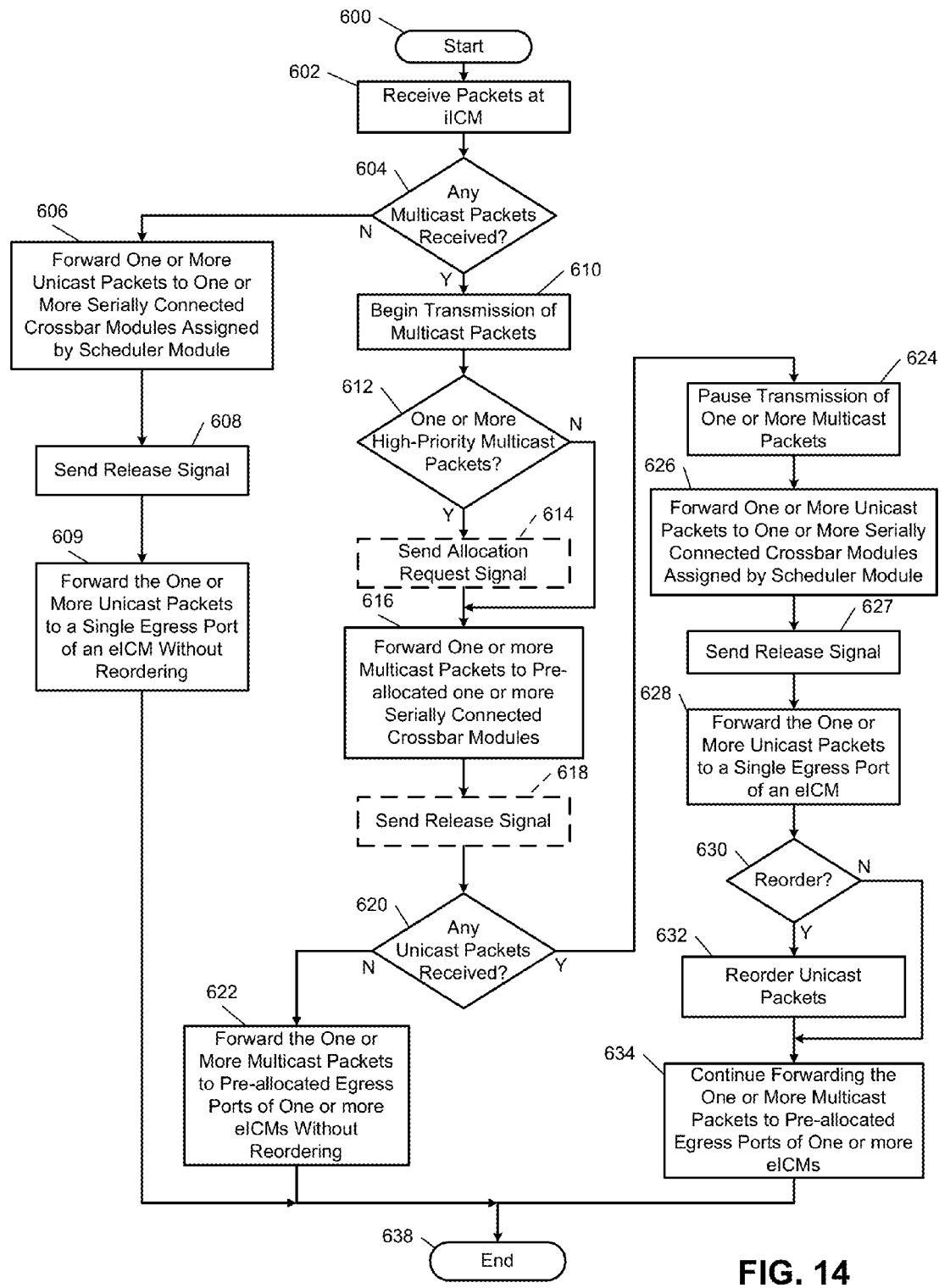
FIG. 14 illustrates a method of handling multicast and unicast packets in accordance with an embodiment of the present disclosure.

FIG. 14 illustrates a method of handling multicast and unicast packets. Although the following tasks are primarily described with respect to the implementations of FIGS. 1-3 and 13, the tasks may be easily modified to apply to other implementations of the present disclosure. The tasks may be iteratively performed.

The method may begin at 600. At 602, an iICM (e.g., one of the ICMs, 32, 52, 140, 142, 552) receives packets. The packets may include unicast packets, high-priority multicast packets, and/or low-priority multicast packets.

At 604, the iICM may determine based on headers of the received packets whether the packets include multicast packets. This may be based on a multicast identifier in a header of one or more of the multicast packets. Task 606 may be performed if the packets do not include multicast packets, otherwise task 610 is performed.

At 606, the iICM forwards one or more unicast packets to one or more serially connected crossbar modules assigned by a scheduler module and in a path allocated for multicast packets.

At 608, the iICM may transmit a release signal to the scheduler module indicating transmission of the one or more unicast packets. This allows the scheduler module to update traffic status levels of links of the one or more serially connected crossbar modules.

At 609, the last crossbar module in the one or more serially connected crossbar modules forwards the one or more unicast packets to an eICM, where the one or more unicast packets are forwarded to an egress port of the eICM. The one or more unicast packets are not reordered prior to forwarding the one or more unicast packets to the egress port. The method may end at 638 subsequent to performing task 609.

At 610, the iICM may begin transmitting the multicast packets to the one or more serially connected crossbar modules.

At 612, the iICM may determine based on the headers of the multicast packets whether the multicast packets are high-priority packets or low-priority packets. If there are one or more high-priority packets, task 614 may be performed, otherwise task 616 is performed. At 614, the iICM may transmit an allocation request signal to a scheduler module, as described above to reserve the path for the high-priority multicast packets for a period of time.

At 616, the iICM forwards one or more of the received multicast packets to pre-allocated one or more crossbar modules (i.e. the one or more serially connected crossbar modules) in the path. At 618, the iICM may transmit a release signal to the scheduler module indicating a collective size of the one or more multicast packets forwarded from the iICM. This may be done for link status update purposes.

At 620, one of the crossbar modules determines whether packets stored in the one of the crossbar modules include one or more unicast packets. If one or more unicast packets are not stored in the one of the crossbar modules, task 622 is performed, otherwise task 624 is performed.

At 622, the received multicast packets are forwarded from the crossbar modules to the pre-allocated egress ports of one or more eICMs of the path without reordering of the one or more multicast packets. The method may end at 638 subsequent to performing task 622.

At 624, one of the pre-allocated crossbar modules pauses transmission of the one or more multicast packets. Although not shown in FIG. 14, transmission of one or more multicast packets may be paused at the iICM.

At 626, the iICM forwards the received one or more unicast packets to the pre-allocated crossbar modules, as assigned by the scheduler module.

At 627, the iICM may transmit a release signal to the scheduler module indicating transmission of the unicast packets from the iICM. This may be done for link status update purposes.

At 628, a last crossbar module in the one or more serially connected crossbar modules forwards the one or more unicast packets to a single eICM corresponding to the unicast packets, which forwards the one or more packets to an egress port of the eICM.

At 630, the single eICM corresponding to the unicast packets receives the unicast packets and determines based on headers of the unicast packets whether the unicast packets need to be reordered. If the unicast packets need to be reordered, task 632 is performed, otherwise task 634 is performed. At 632, the eICM reorders the unicast packets.

At 634, the pre-allocated crossbar modules forwards the remaining portion of a multicast packet and/or remaining multicast packets to the one or more eICMs and/or egress ports corresponding to the multicast identifier of the multicast packets. The method may end at 438 subsequent to performing task 636.

The above-described tasks are meant to be illustrative examples; the tasks may be performed sequentially, synchronously, simultaneously, continuously, during overlapping time periods or in a different order depending upon the application. Also, any of the tasks may not be performed or skipped depending on the implementation and/or sequence of events.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

In this application, including the definitions below, the term module may be replaced with the term circuit. The term module may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The term code, as used above, may include software, firmware, and/or microcode, and may refer to programs, routines, functions, classes, and/or objects. The term shared processor encompasses a single processor that executes some or all code from multiple modules. The term group processor encompasses a processor that, in combination with additional processors, executes some or all code from one or more modules. The term shared memory encompasses a single memory that stores some or all code from multiple modules. The term group memory encompasses a memory that, in combination with additional memories, stores some or all code from one or more modules. The term memory may be a subset of the term computer-readable medium. The term computer-readable medium does not encompass transitory electrical and electromagnetic signals propagating through a medium, and may therefore be considered tangible and non-transitory. Non-limiting examples of a non-transitory tangible computer readable medium include nonvolatile memory, volatile memory, magnetic storage, and optical storage.

The apparatuses and methods described in this application may be partially or fully implemented by one or more computer programs executed by one or more processors. The computer programs include processor-executable instructions that are stored on at least one non-transitory tangible computer readable medium. The computer programs may also include and/or rely on stored data.

What is claimed is:

1. An access system comprising:
   a plurality of line cards including a first line card and a second line card, wherein the first line card comprises
      a physical layer module configured to receive a first packet, and
      a first interface control module configured to generate a first request signal to transfer the first packet, wherein the first request signal comprises an identifier of a second interface control module in the second line card; and
   a plurality of crossbar modules separate from the plurality of line cards, wherein the plurality of crossbar modules comprise a first crossbar module and a second crossbar module, wherein the first crossbar module comprises a first scheduler module, wherein the second crossbar module is configured to transfer a plurality of packets between a pair of the plurality of line cards, and wherein the plurality of packets includes the first packet,
   wherein the first scheduler module is separate from the plurality of line cards and the first scheduler module is configured to, based on the first request signal, schedule the transfer of the first packet or the plurality of packets from the first interface control module, through the second crossbar module, and to the second interface control module.

2. The access system of claim 1, wherein:
   each of the plurality of crossbar modules is allocated to a respective one or more pairs of the plurality of line cards; and
   each of the plurality of crossbar modules is not allocated to a same pair of the plurality of line cards as the other ones of the plurality of crossbar modules.

3. The access system of claim 1, wherein the second crossbar module is configured to schedule transfers of packets through each of the plurality of crossbar modules.

4. The access system of claim 1, wherein:
   the first line card or the first interface control module is configured to transmit the first request signal to the first crossbar module; and
   the first crossbar module is configured to transmit the first request signal to the first scheduler module.

5. The access system of claim 1, wherein:
   a first one or more of the plurality of crossbar modules are allocated for scheduling of packets;
   the first one or more of the plurality of crossbar modules includes the first crossbar module;
   a second one or more of the plurality of crossbar modules are allocated for transferring packets between pairs of the plurality of line cards;
   the second one or more of the plurality of crossbar modules includes the second crossbar module; and
   the first one or more of the plurality of crossbar modules schedule transfers of packets through the second one or more of the plurality of crossbar modules.

6. The access system of claim 1, wherein:
   at least one of the first line card or the first interface control module is configured to (i) generate the first request signal to transfer the first packet from the first line card to at least one of the second line card or the second interface control module, and (ii) transmit the first request signal to the scheduler module;
   the scheduler module is configured to transmit a first acknowledgement signal indicating a first one or more of the plurality of crossbar modules through which the first packet is to be passed; and
   at least one of the first line card or the first interface control module is configured to, in response to the first acknowledgement signal, transmit the first packet to at least one of the second line card and the second interface control module via the a first one or more of the plurality of crossbar modules.

7. The access system of claim 1, wherein:
   at least one of the first line card or the first interface control module is configured to (i) generate the first request signal to transfer the first packet from the first line card to at least one of the second line card or the second interface control module, and (ii) transmit the first request signal to the scheduler module;
   at least one of the first line card or the first interface control module is configured to, subsequent to the transmitting of the first request signal, (i) generate a second request signal to transfer one or more sets of packets from the first interface control module to the second interface control module or a third interface control module, wherein the third interface control module is on a third line card, and (ii) transmit the second request signal to the scheduler module;
   the one or more sets of packets does not include the first packet;
   the first line card is configured to send a release signal to the scheduler module, wherein the release signal indicates a collective size of the first packet and the one or more sets of packets;
   the scheduler module is configured to (i) drop the first request signal, and (ii) transmit an acknowledgement signal indicating one or more of the plurality of crossbar modules through which the one or more sets of packets is to be passed; and
   the first line card is configured to, based on the acknowledgement signal, transmit the first packet and the one or more sets of packets.

8. The access system of claim 1, wherein:
the scheduler module is configured to (i) select a crossbar module for the first packet, and (ii) generate an acknowledgement signal;
the acknowledgement signal includes (i) a link identifier for the selected crossbar module, and (ii) a link identifier for the second interface control module;
the first interface control module is configured to, based on the link identifier of the selected crossbar module, forward the first packet to the selected crossbar module; and
the selected crossbar module is configured to, based on the link identifier of the second interface control module, forward the first packet to the second interface control module.

9. The access system of claim 1, wherein:
the plurality of line cards are configured to generate request signals to transfer data via the plurality of crossbar modules;
the scheduler module is configured to prevent links of the plurality of crossbar modules from being used for a request signal to transfer a first amount of data until a request signal to transfer a second amount of data have been satisfied;
the first amount of data is less than an amount of data in a full set of packets; and
the second amount of data is greater than or equal to the amount of data in a full set of packets.

10. The access system of claim 1, wherein:
one of the plurality of crossbar modules is configured to (i) determine a fill level of a queue in the one of the plurality of crossbar modules, (ii) in response to the fill level of the queue being different than a predetermined level, send a first status message to at least one of the second line card or the second interface control module, wherein the predetermined level is at least one of (i) equal to a status value stored in the scheduler module, or (ii) set based on a size of one or more sets of packets corresponding to the first request signal;
at least one of the second line card or the second interface control module is configured to one of (i) forward the first status message to the scheduler module, or (ii) generate a second status message based on the first status message and transmit the second status message to the scheduler module; and
the scheduler module is configured to adjust the status value based on the first status message or the second status message.

11. The access system of claim 1, wherein the scheduler module is configured to:
receive one or more first request signals from one or more of the plurality of line cards, wherein each of the first request signals is for a non-full set of packets, and wherein a full set of packets has a predetermined number of packets;
subsequent to receiving the one or more first request signals, receive one or more second request signals from one or more of the plurality of line cards, wherein each of the one or more second request signals is for one or more full sets of packets; and
prior to scheduling transfer of the non-full sets of packets, schedule transfer of the one or more full sets of packets from the one or more of the plurality of line cards to the plurality of crossbar modules.

12. The access system of claim 1, wherein the scheduler module comprises:
a first pruning module configured to (i) determine whether there is an available crossbar module for the first request signal, and (ii) if there is an available crossbar, forward the first request signal;
a second pruning module configured to (i) determine whether there is an available crossbar module for a second request signal, and (ii) if there is an available crossbar module, forward the second request signal; and
at least one arbitration module configured to arbitrate the first request signal and the second request signal including selecting an order in which the first request signal and the second request signal are to be forwarded from the at least one arbitration module.

13. The access system of claim 1, wherein the scheduler module comprises:
a plurality of pruning modules configured to (i) monitor states of queues, wherein the queues store a plurality of request signals for one or more of the plurality of line cards, (ii) determine whether there is one or more available crossbar modules for the plurality of request signals, and (iii) forward the plurality of request signals when there is one or more available crossbar modules;
a first arbitration module configured to arbitrate the plurality of request signals including selecting an order in which the plurality of request signals are forwarded from the first arbitration module;
a second arbitration module configured to arbitrate the plurality of request signals including selecting an order in which the plurality of request signals are forwarded from the second arbitration module; and
an acknowledgement module configured to (i) receive the plurality of request signals from the second arbitration module, (ii) generate acknowledgement signals based on the plurality of request signals, and (iii) forward the acknowledgement signals to respective interface control modules of the plurality of line cards.

14. The access system of claim 1, wherein:
the first interface control module is configured to (i) aggregate a second plurality of packets, (ii) generate a second request signal for the second plurality of packets, and (iii) forward the second request signal to the scheduler module;
the scheduler module is configured to generate an acknowledgement signal in response to the second request signal; and
the first line card is configured to forward the second plurality of packets to the second line card in response to the acknowledgement signal.

15. The access system of claim 1, wherein the scheduler module is configured to:
receive a plurality of request signals for a plurality of packets from the first line card;
generate a single acknowledgment signal for the plurality of request signals; and
transmit the acknowledgment signal for the plurality of request signals to the first line card.

16. The access system of claim 1, comprising:
a first one of the plurality of line cards, the scheduler module, and one of the plurality of crossbar modules comprises
a medium access control module configured to generate one of a control signal and a data signal based on the first packet, wherein the data signal includes the first packet,
a first message module configured to insert a control message into one of the control signal and the data signal, and the physical layer module is configured to transmit the one of the control signal and the data signal to a second one of the plurality of line cards, the scheduler module, and one of the plurality of crossbar modules; and the second one of the plurality of line cards, the scheduler module, and one of the plurality of crossbar modules comprises a second physical layer module configured to receive the one of the control signal and the data signal, and a second message module configured to (i) remove the control message from the one of the control signal and the data signal, and (ii) forward the one of the control signal and the data signal without the control message to a second medium access control module.

17. The access system of claim 1, wherein:
the plurality of line cards comprise a third line card;
the third line card is configured to
  receive a second packet, wherein the second packet is larger than the first packet,
  determine a size of the second packet to be greater than a predetermined size,
  split up the second packet into at least a first portion and a second portion,
  generate a second request signal for the first portion of the second packet, and
  generate a third request signal for the second portion of the second packet; and
the scheduler module is configured to generate (i) a first acknowledgment signal based on the first packet, (ii) generate a second acknowledgement signal based on the first portion of the second packet, and (iii) generate a third acknowledgement signal based on the second portion of the second packet,
wherein the first line card is configured to forward the first packet based on the first acknowledgment signal, and
wherein the second line card is configured to (i) forward the first portion of the second packet based on the second acknowledgement signal, and (ii) forward the second portion of the second packet based on the third acknowledgement signal.

18. The access system of claim 1, wherein one of the plurality of crossbar modules is configured to interleave unicast packets in a multicast packet.

19. The access system of claim 1, wherein:
the scheduler module is configured to delay transmission of a unicast packet on a link based on transmission of a multicast packet on the link; and
the link is (i) between the first line card and one of the plurality of crossbar modules, or (ii) between the one of the plurality of crossbar modules and the second line card.

20. The access system of claim 1, wherein:
the first line card is configured to generate the first request signal to schedule transmission of the plurality of packets;
the first scheduler module is configured to, based on the first request signal, (i) schedule the plurality of packets, and (ii) generate an acknowledgement signal;
the first line card is configured to, based on the acknowledgement signal, (i) transmit the plurality of packets, and (ii) generate a release signal indicating a collective size of the plurality of packets; and
the first line card is configured to (I) adjust status values of traffic on links in the access system based on the release signal, and (ii) schedule a transmission of a packet, not included in the plurality of packets, based on the status values.

* * * * *